US012700981B2

(12) United States Patent
Abdelghaffar et al.

(10) Patent No.: US 12,700,981 B2
(45) Date of Patent: Aug. 4, 2026

(54) COLLISION HANDLING FOR SUB-BAND FULL DUPLEX AWARE USER EQUIPMENT

(71) Applicant: QUALCOMM Incorporated, San Diego, CA (US)

(72) Inventors: Muhammad Sayed Khairy Abdelghaffar, San Jose, CA (US); Qian Zhang, Basking Ridge, NJ (US); Abdelrahman Mohamed Ahmed Mohamed Ibrahim, San Diego, CA (US); Yan Zhou, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 339 days.

(21) Appl. No.: 18/482,303

(22) Filed: Oct. 6, 2023

(65) Prior Publication Data

US 2024/0121070 A1 Apr. 11, 2024

Related U.S. Application Data

(60) Provisional application No. 63/378,896, filed on Oct. 10, 2022.

(51) Int. Cl.
H04L 5/14 (2006.01)
H04W 48/12 (2009.01)

(52) U.S. Cl.
CPC .............. H04L 5/14 (2013.01); H04W 48/12 (2013.01)

(58) Field of Classification Search
None
See application file for complete search history.

(56) References Cited

U.S. PATENT DOCUMENTS

| | | | | |
|---|---|---|---|---|
| 12,302,266 | B2* | 5/2025 | Kim ....................... | H04L 5/0053 |
| 2023/0054111 | A1* | 2/2023 | Rudolf .............. | H04W 72/0446 |
| 2023/0224880 | A1* | 7/2023 | Xiong ............... | H04W 72/0446 |
| | | | | 370/329 |
| 2024/0381444 | A1* | 11/2024 | Han ................... | H04W 74/0833 |
| 2024/0389157 | A1* | 11/2024 | Nhan ........................ | H04L 5/14 |
| 2025/0287387 | A1* | 9/2025 | Kurita ................... | H04W 72/23 |
| 2025/0301505 | A1* | 9/2025 | Choi ................. | H04W 74/0833 |

OTHER PUBLICATIONS

Ericsson: "Sub-Non-Overlapband Ping Full Duplex", 3GPP TSG-RAN WG1 Meeting #110bis-e, R1-2209175, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, pp. 1-39, XP052277093, Sections 2, 3.

(Continued)

*Primary Examiner* — Hong S Cho
(74) *Attorney, Agent, or Firm* — Harrity & Harrity, LLP

(57) ABSTRACT

Various aspects of the present disclosure generally relate to wireless communication. In some aspects, a user equipment (UE) may receive an indication that a network node is operating in a sub-band full duplex mode in a set of symbols. The UE may identify whether to receive at least one of a synchronization signal block communication or a physical downlink control channel communication associated with a common search space in the set of symbols based at least in part on the indication. Numerous other aspects are described.

30 Claims, 12 Drawing Sheets

(56)                   References Cited

OTHER PUBLICATIONS

International Search Report and Written Opinion—PCT/US2023/076333—ISA/EPO—Apr. 19, 2024.
Partial International Search Report—PCT/US2023/076333—ISA/EPO—Feb. 8, 2024.
Qualcomm Incorporated: "Feasibility and Techniques for Subband Non-overlapping Full Duplex", 3GPP TSG RAN WG1, Meeting #110bis-e, R1-2209983, 3rd Generation Partnership Project, Mobile Competence Centre, 650, Route Des Lucioles, F-06921 Sophia-Antipolis Cedex, France, vol. RAN WG1, No. e-Meeting, Oct. 10, 2022-Oct. 19, 2022, Sep. 30, 2022, XP052259454, 37 Pages, Sections 2-4.

* cited by examiner

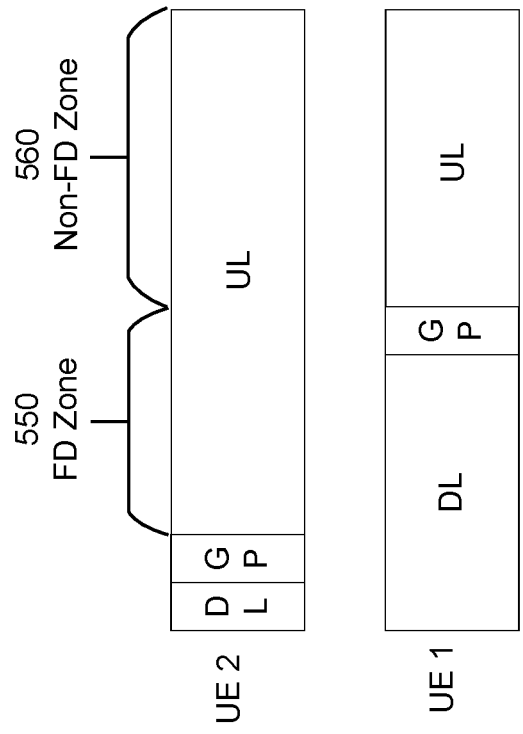
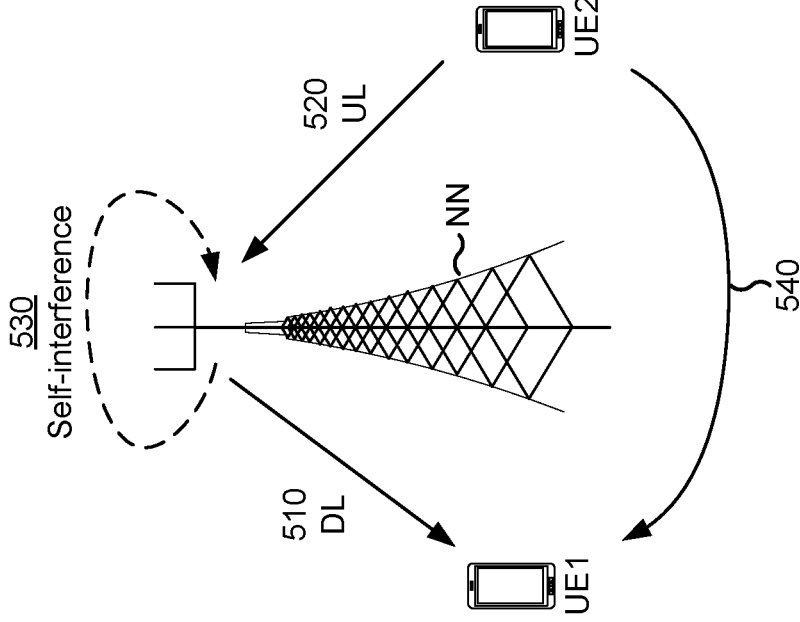
FIG. 5

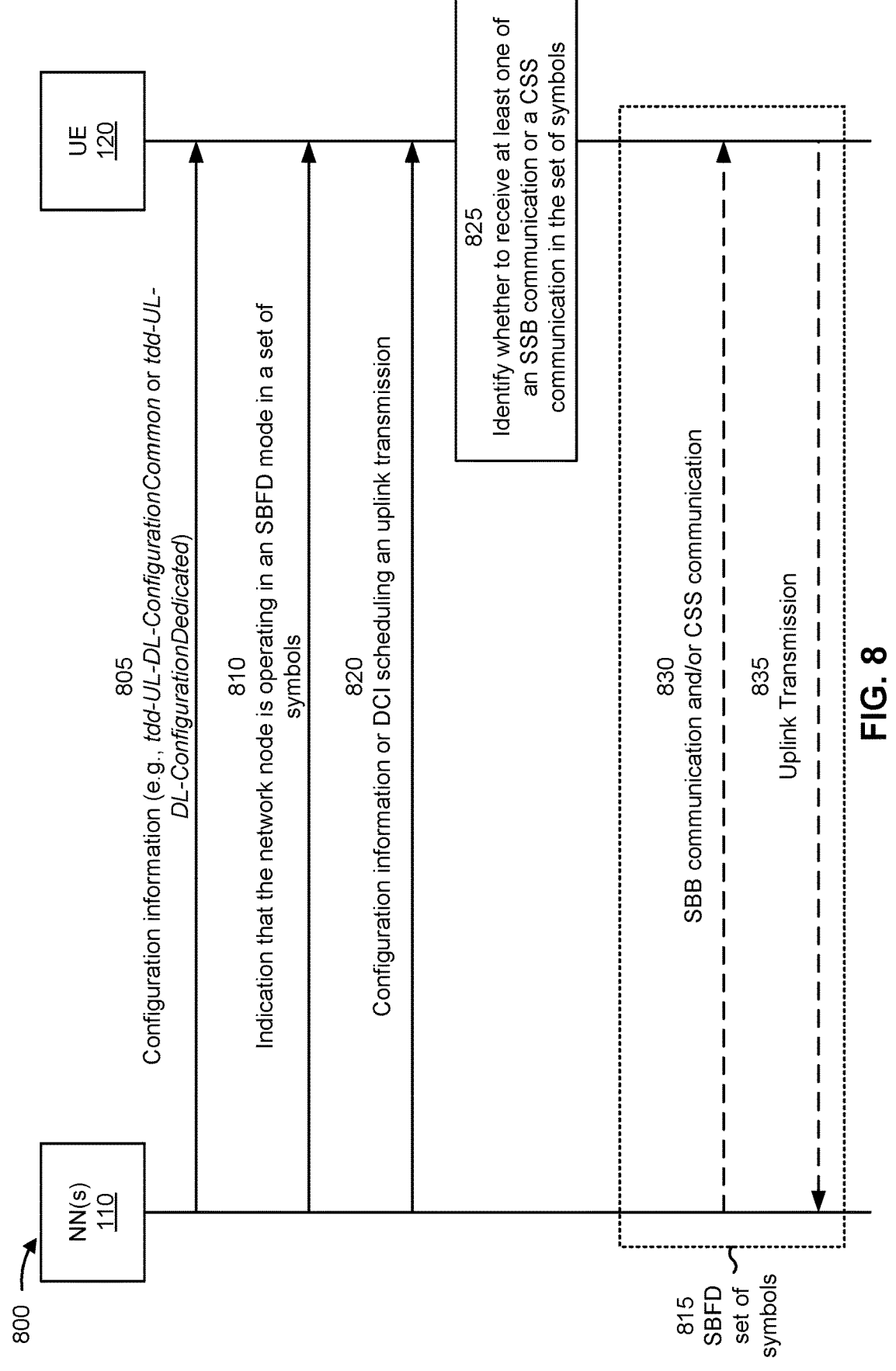

800

NN(s)
110

UE
120

805

Configuration information (e.g., *tdd-UL-DL-ConfigurationCommon* or *tdd-UL-DL-ConfigurationDedicated*)

810

Indication that the network node is operating in an SBFD mode in a set of symbols

820

Configuration information or DCI scheduling an uplink transmission

825

Identify whether to receive at least one of an SSB communication or a CSS communication in the set of symbols

830

SBB communication and/or CSS communication

835

Uplink Transmission

815
SBFD
set of
symbols

FIG. 8

1010 — Receive an indication that a network node is operating in an SBFD mode in a set of symbols 1020 — Identify whether to receive at least one of an SSB communication or a PDCCH communication associated with a CSS in the set of symbols based at least in part on the indication

1000

1110 Receive an indication that a network node is operating in an SBFD mode in a set of symbols 1120 Identify whether to transmit a communication in an RO associated with the set of symbols based at least in part on the indication

1100

COLLISION HANDLING FOR SUB-BAND FULL DUPLEX AWARE USER EQUIPMENT

CROSS-REFERENCE TO RELATED APPLICATION

This Patent Application claims priority to U.S. Provisional Patent Application No. 63/378,896, filed on Oct. 10, 2022, and entitled "COLLISION HANDLING FOR SUB-BAND FULL DUPLEX AWARE USER EQUIPMENT." The disclosure of the prior Application is considered part of and is incorporated by reference into this Patent Application.

FIELD OF THE DISCLOSURE

Aspects of the present disclosure generally relate to wireless communication and to techniques and apparatuses for collision handling for a sub-band full duplex aware user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more network nodes that support communication for wireless communication devices, such as a user equipment (UE) or multiple UEs. A UE may communicate with a network node via downlink communications and uplink communications. "Downlink" (or "DL") refers to a communication link from the network node to the UE, and "uplink" (or "UL") refers to a communication link from the UE to the network node. Some wireless networks may support device-to-device communication, such as via a local link (e.g., a sidelink (SL), a wireless local area network (WLAN) link, and/or a wireless personal area network (WPAN) link, among other examples).

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving an indication that a network node is operating in a sub-band full duplex (SBFD) mode in a set of symbols. The method may include identifying whether to receive at least one of a synchronization signal block (SSB) communication or a physical downlink control channel (PDCCH) communication associated with a common search space (CSS) in the set of symbols based at least in part on the indication.

Some aspects described herein relate to a method of wireless communication performed by a UE. The method may include receiving an indication that a network node is operating in an SBFD mode in a set of symbols. The method may include identifying whether to transmit a communication in a random access channel (RACH) occasion (RO) associated with the set of symbols based at least in part on the indication.

Some aspects described herein relate to a UE for wireless communication. The UE may include one or more memories and one or more processors coupled to the one or more memories. The one or more processors may be configured to receive an indication that a network node is operating in an SBFD mode in a set of symbols. The one or more processors may be configured to identify whether to receive at least one of an SSB communication or a PDCCH communication associated with a CSS in the set of symbols based at least in part on the indication.

Some aspects described herein relate to a UE for wireless communication. The UE may include one or more memories and one or more processors coupled to the one or more memories. The one or more processors may be configured to receive an indication that a network node is operating in an SBFD mode in a set of symbols. The one or more processors may be configured to identify whether to transmit a communication in an RO associated with the set of symbols based at least in part on the indication.

Some aspects described herein relate to a non-transitory computer-readable medium that stores a set of instructions for wireless communication by a UE. The set of instructions, when executed by one or more processors of the UE, may cause the UE to receive an indication that a network node is operating in an SBFD mode in a set of symbols. The set of instructions, when executed by one or more processors of the UE, may cause the UE to identify whether to receive at least one of an SSB communication or a PDCCH communication associated with a CSS in the set of symbols based at least in part on the indication.

Some aspects described herein relate to a non-transitory computer-readable medium that stores a set of instructions for wireless communication by a UE. The set of instructions, when executed by one or more processors of the UE, may cause the UE to receive an indication that a network node is operating in an SBFD mode in a set of symbols. The set of instructions, when executed by one or more processors of the UE, may cause the UE to identify whether to transmit a communication in an RO associated with the set of symbols based at least in part on the indication.

Some aspects described herein relate to an apparatus for wireless communication. The apparatus may include means for receiving an indication that a network node is operating in an SBFD mode in a set of symbols. The apparatus may include means for identifying whether to receive at least one of an SSB communication or a PDCCH communication associated with a CSS in the set of symbols based at least in part on the indication.

Some aspects described herein relate to an apparatus for wireless communication. The apparatus may include means for receiving an indication that a network node is operating in an SBFD mode in a set of symbols. The apparatus may include means for identifying whether to transmit a communication in an RO associated with the set of symbols based at least in part on the indication.

Aspects generally include a method, apparatus, system, computer program product, non-transitory computer-readable medium, user equipment, base station, network entity, network node, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

FIG. 5 is a diagram illustrating an example of a full duplex (FD) zone, a non-FD zone, and self-interference associated with FD communications, in accordance with the present disclosure.

FIG. 8 is a diagram of an example associated with collision handling for SBFD-aware UEs, in accordance with the present disclosure.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
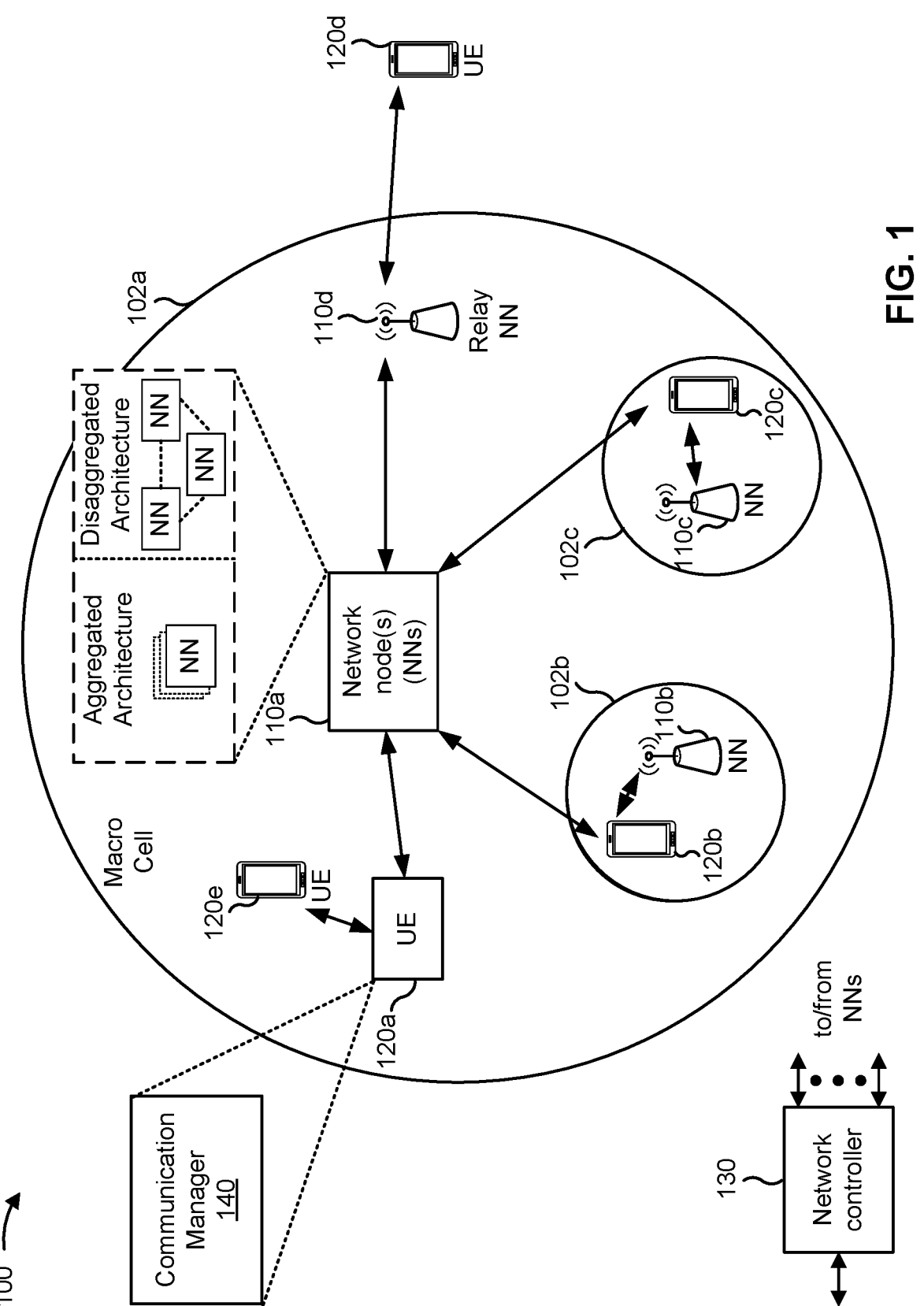
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more network nodes 110 (shown as a network node 110a, a network node 110b, a network node 110c, and a network node 110d), a user equipment (UE) 120 or multiple UEs 120 (shown as a UE 120a, a UE 120b, a UE 120c, a UE 120d, and a UE 120e), and/or other entities. A network node 110 is a network node that communicates with UEs 120. As shown, a network node 110 may include one or more network nodes. For example, a network node 110 may be an aggregated network node, meaning that the aggregated network node is configured to utilize a radio protocol stack that is physically or logically integrated within a single radio access network (RAN) node (e.g., within a single device or unit). As another example, a network node 110 may be a disaggregated network node (sometimes referred to as a disaggregated base station), meaning that the network node 110 is configured to utilize a protocol stack that is physically or logically distributed among two or more nodes (such as one or more central units (CUs), one or more distributed units (DUs), or one or more radio units (RUs)).

In some examples, a network node 110 is or includes a network node that communicates with UEs 120 via a radio access link, such as an RU. In some examples, a network node 110 is or includes a network node that communicates with other network nodes 110 via a fronthaul link or a midhaul link, such as a DU. In some examples, a network node 110 is or includes a network node that communicates with other network nodes 110 via a midhaul link or a core network via a backhaul link, such as a CU. In some examples, a network node 110 (such as an aggregated network node 110 or a disaggregated network node 110) may include multiple network nodes, such as one or more RUs, one or more CUs, and/or one or more DUs. A network node 110 may include, for example, an NR base station, an LTE base station, a Node B, an eNB (e.g., in 4G), a gNB (e.g., in 5G), an access point, a transmission reception point (TRP), a DU, an RU, a CU, a mobility element of a network, a core network node, a network element, a network equipment, a RAN node, or a combination thereof. In some examples, the network nodes 110 may be interconnected to one another or to one or more other network nodes 110 in the wireless network 100 through various types of fronthaul, midhaul, and/or backhaul interfaces, such as a direct physical connection, an air interface, or a virtual network, using any suitable transport network.

In some examples, a network node 110 may provide communication coverage for a particular geographic area. In the Third Generation Partnership Project (3GPP), the term "cell" can refer to a coverage area of a network node 110 and/or a network node subsystem serving this coverage area, depending on the context in which the term is used. A network node 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscriptions. A femto cell may cover a relatively small geographic area (e.g., a home) and may allow restricted access by UEs 120 having association with the femto cell (e.g., UEs 120 in a closed subscriber group (CSG)). A network node 110 for a macro cell may be referred to as a macro network node. A network node 110 for a pico cell may be referred to as a pico network node. A network node 110 for a femto cell may be referred to as a femto network node or an in-home network node. In the example shown in FIG. 1, the network node 110a may be a macro network node for a macro cell 102a, the network node 110b may be a pico network node for a pico cell 102b, and the network node 110c may be a femto network node for a femto cell 102c. A network node may support one or multiple (e.g., three) cells. In some examples, a cell may not necessarily be stationary, and the geographic area of the cell may move according to the location of a network node 110 that is mobile (e.g., a mobile network node).

In some aspects, the terms "base station" or "network node" may refer to an aggregated base station, a disaggregated base station, an integrated access and backhaul (IAB) node, a relay node, or one or more components thereof. For example, in some aspects, "base station" or "network node" may refer to a CU, a DU, an RU, a Near-Real Time (Near-RT) RAN Intelligent Controller (RIC), or a Non-Real Time (Non-RT) RIC, or a combination thereof. In some aspects, the terms "base station" or "network node" may refer to one device configured to perform one or more functions, such as those described herein in connection with the network node 110. In some aspects, the terms "base station" or "network node" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network node" may refer to any one or more of those different devices. In some aspects, the terms "base station" or "network node" may refer to one or more virtual base stations or one or more virtual base station functions. For example, in some aspects, two or more base station functions may be instantiated on a single device. In some aspects, the terms "base station" or "network node" may refer to one of the base station functions and not another. In this way, a single device may include more than one base station.

The wireless network 100 may include one or more relay stations. A relay station is a network node that can receive a transmission of data from an upstream node (e.g., a network node 110 or a UE 120) and send a transmission of the data to a downstream node (e.g., a UE 120 or a network node 110). A relay station may be a UE 120 that can relay transmissions for other UEs 120. In the example shown in FIG. 1, the network node 110*d* (e.g., a relay network node) may communicate with the network node 110*a* (e.g., a macro network node) and the UE 120*d* in order to facilitate communication between the network node 110*a* and the UE 120*d*. A network node 110 that relays communications may be referred to as a relay station, a relay base station, a relay network node, a relay node, a relay, or the like.

The wireless network 100 may be a heterogeneous network that includes network nodes 110 of different types, such as macro network nodes, pico network nodes, femto network nodes, relay network nodes, or the like. These different types of network nodes 110 may have different transmit power levels, different coverage areas, and/or different impacts on interference in the wireless network 100. For example, macro network nodes may have a high transmit power level (e.g., 5 to 40 watts) whereas pico network nodes, femto network nodes, and relay network nodes may have lower transmit power levels (e.g., 0.1 to 2 watts).

A network controller 130 may couple to or communicate with a set of network nodes 110 and may provide coordination and control for these network nodes 110. The network controller 130 may communicate with the network nodes 110 via a backhaul communication link or a midhaul communication link. The network nodes 110 may communicate with one another directly or indirectly via a wireless or wireline backhaul communication link. In some aspects, the network controller 130 may be a CU or a core network device, or may include a CU or a core network device.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, a UE function of a network node, and/or any other suitable device that is configured to communicate via a wireless or wired medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a network node, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a network node 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the network node 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include midband frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may receive an indication that a network node 110 is operating in a sub-band full duplex (SBFD) mode in a set of symbols, and identify whether to receive at least one of a synchronization signal block (SSB) communication or a physical downlink control channel (PDCCH) communication associated with a common search space (CSS) in the set of symbols based at least in part on the indication. In some other aspects, the communication manager 140 may receive an indication that a network node 110 is operating in an SBFD mode in a set of symbols, and identify whether to transmit a communication in a random access channel (RACH) occasion (RO) associated with the set of symbols based at least in part on the indication. Additionally, or alternatively, the communication manager 140 may perform one or more other operations described herein.

As indicated above, FIG. 1 is provided as an example. Other examples may differ from what is described with regard to FIG. 1.

Figure 2:
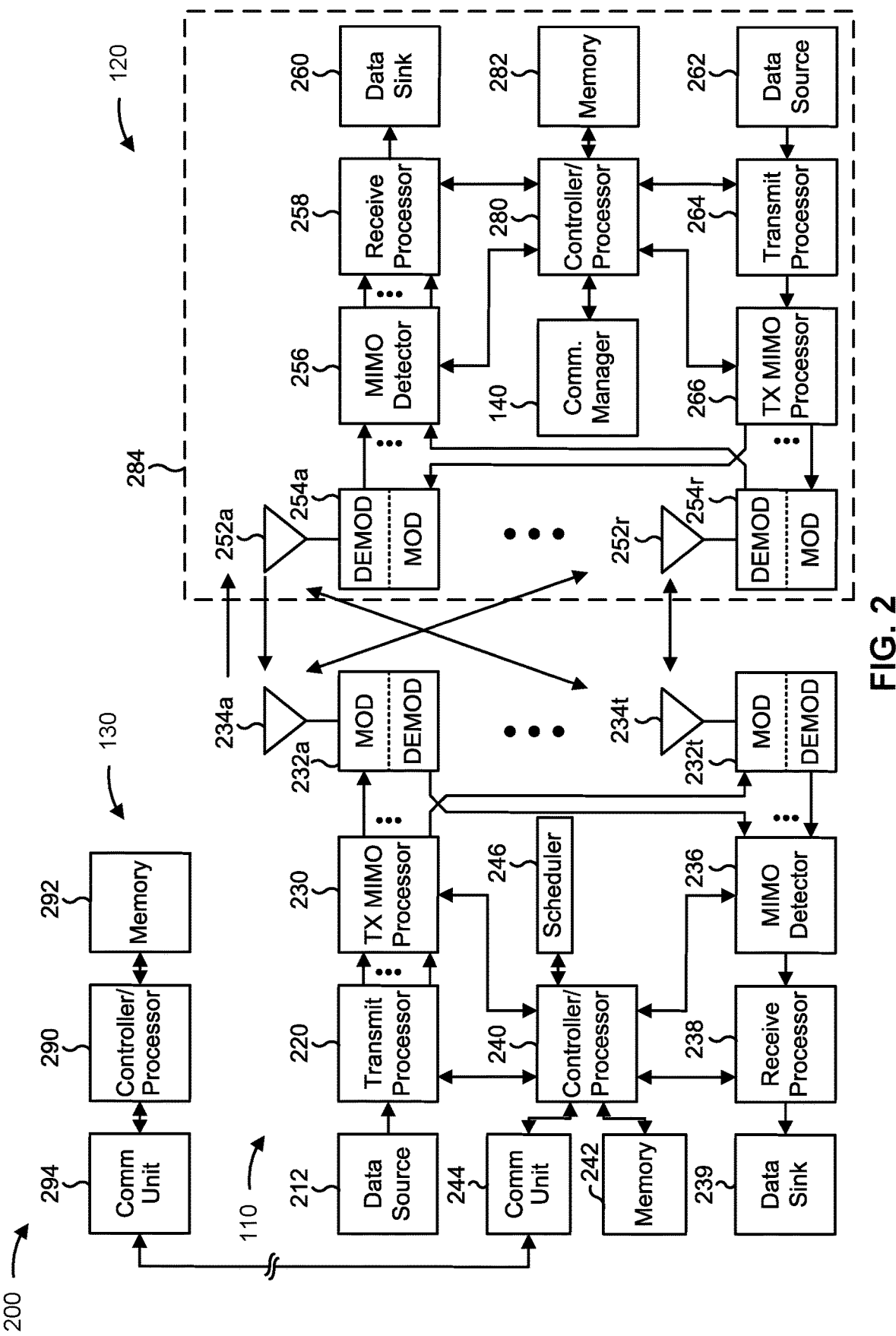
FIG. 2 is a diagram illustrating an example of a network node in communication with a user equipment (UE) in a wireless network, in accordance with the present disclosure.

FIG. 2 is a diagram illustrating an example 200 of a network node 110 in communication with a UE 120 in a wireless network 100, in accordance with the present disclosure. The network node 110 may be equipped with a set of antennas 234a through 234t, such as T antennas (T≥1). The UE 120 may be equipped with a set of antennas 252a through 252r, such as R antennas (R≥1). The network node 110 of example 200 includes one or more radio frequency components, such as antennas 234 and a modem 254. In some examples, a network node 110 may include an interface, a communication component, or another component that facilitates communication with the UE 120 or another network node. Some network nodes 110 may not include radio frequency components that facilitate direct communication with the UE 120, such as one or more CUs, or one or more DUs.

At the network node 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The network node 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the network node 110 and/or other network nodes 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the network node 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the network node 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 8-12).

At the network node 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The network node 110 may include a communication unit 244 and may communicate with the network controller 130 via the communication unit 244. The network node 110 may include a scheduler 246 to schedule one or more UEs 120 for downlink and/or uplink communications. In some examples, the modem 232 of the network node 110 may include a modulator and a demodulator. In some examples, the network node 110 includes a transceiver. The transceiver may include any combination of the antenna(s) 234, the modem(s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 8-12).

The controller/processor 240 of the network node 110, the controller/processor 280 of the UE 120, and/or any other component(s) of FIG. 2 may perform one or more techniques associated with collision handling for SBFD-aware UEs, as described in more detail elsewhere herein. For example, the controller/processor 240 of the network node 110, the controller/processor 280 of the UE 120, and/or any other component(s) of FIG. 2 may perform or direct operations of, for example, process 1000 of FIG. 10, process 1100 of FIG. 11, and/or other processes as described herein. The memory 242 and the memory 282 may store data and program codes for the network node 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the network node 110 and/or the UE 120, may cause the one or more processors, the UE 120, and/or the network node 110 to perform or direct operations of, for example, process 1000 of FIG. 10, process 1100 of FIG. 11, and/or other processes as described herein. In some examples, executing instructions may include running the instructions, converting the instructions, compiling the instructions, and/or interpreting the instructions, among other examples.

In some aspects, the UE 120 includes means for receiving an indication that a network node is operating in an SBFD mode in a set of symbols; and/or means for identifying whether to receive at least one of an SSB communication or a PDCCH communication associated with a CSS in the set of symbols based at least in part on the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE 120 includes means for receiving an indication that a network node is operating in an SBFD mode in a set of symbols; and/or means for identifying whether to transmit a communication in an RO associated with the set of symbols based at least in part on the indication. The means for the UE 120 to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR base station, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station. "Network entity" or "network node" may refer to a disaggregated base station, or to one or more units of a disaggregated base station (such as one or more CUs, one or more DUs, one or more RUs, or a combination thereof).

An aggregated base station (e.g., an aggregated network node) may be configured to utilize a radio protocol stack that is physically or logically integrated within a single RAN node (e.g., within a single device or unit). A disaggregated base station (e.g., a disaggregated network node) may be configured to utilize a protocol stack that is physically or logically distributed among two or more units (such as one or more CUs, one or more DUs, or one or more RUs). In some examples, a CU may be implemented within a network node, and one or more DUs may be co-located with the CU, or alternatively, may be geographically or virtually distributed throughout one or multiple other network nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

Figure 3:
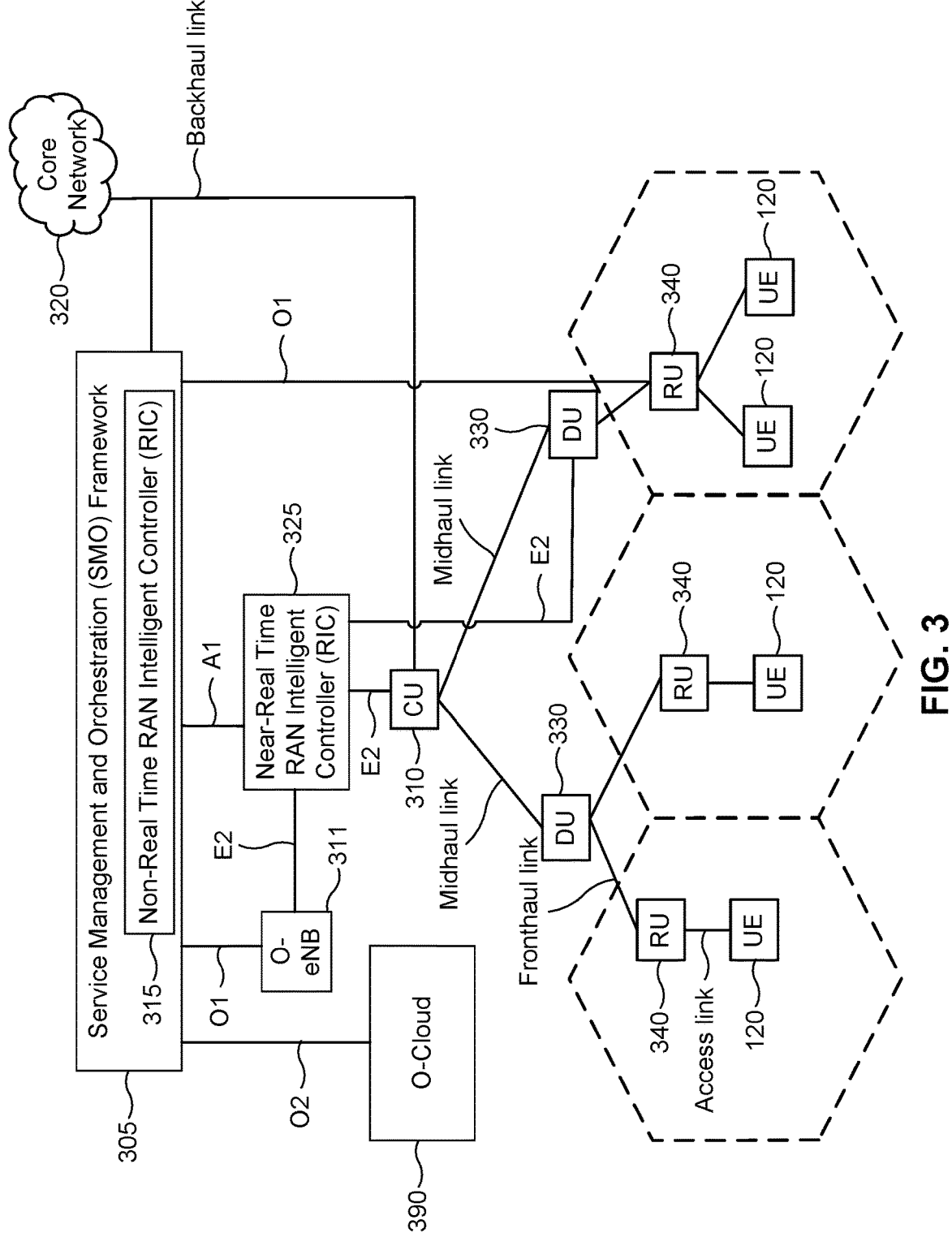
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as an RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (for example, Central Unit—User Plane (CU-UP) functionality), control plane functionality (for example, Central Unit—Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a medium access control (MAC) layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which also may be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based on a functional split (for example, a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework 305 (such as reconfiguration via an O1 interface) or via creation of RAN management policies (such as A1 interface policies).

As indicated above, FIG. 3 is provided as an example. Other examples may differ from what is described with regard to FIG. 3.

Figure 4:
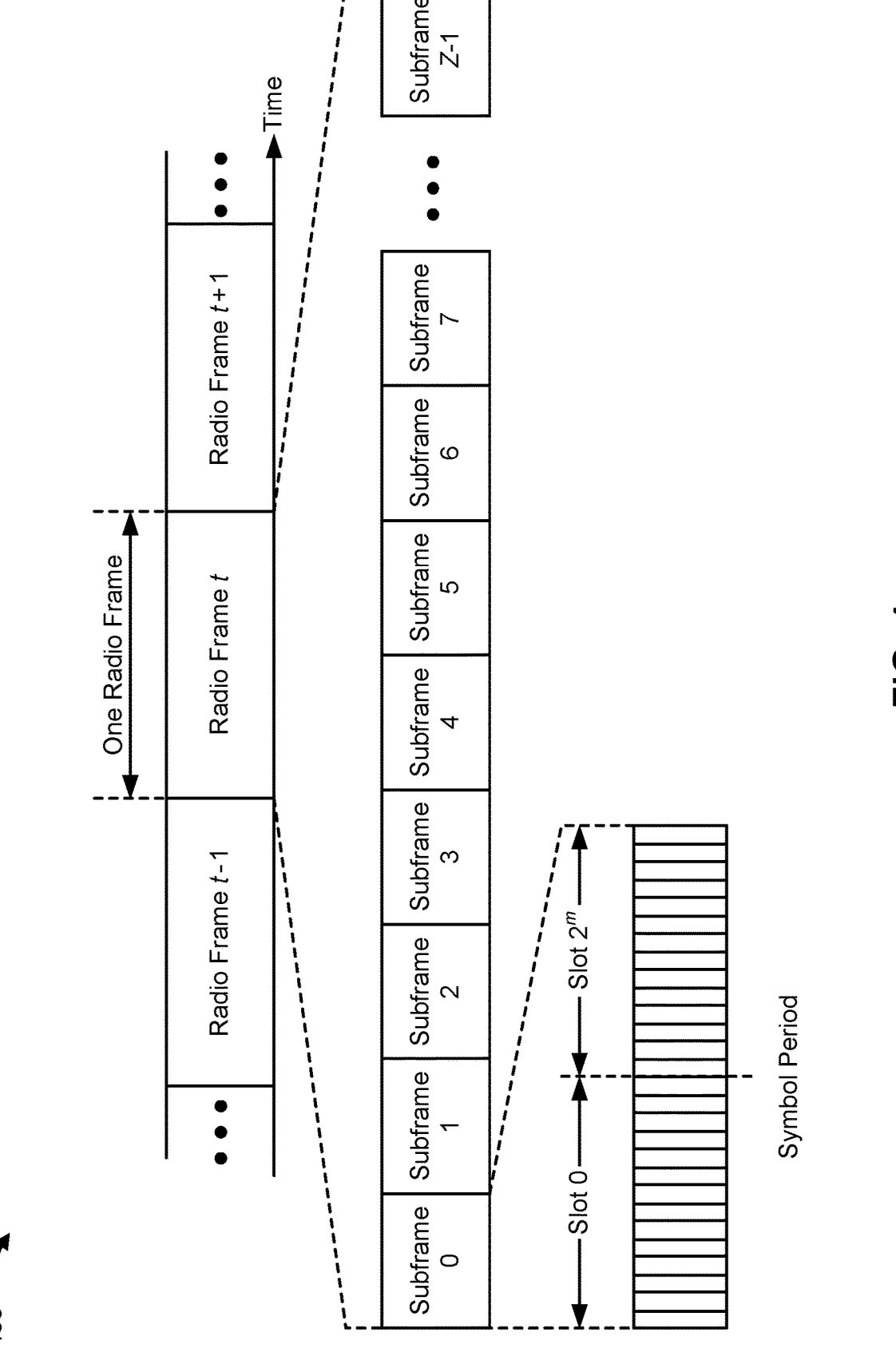
FIG. 4 is a diagram illustrating an example of a frame structure in a wireless communication network, in accordance with the present disclosure.

FIG. 4 is a diagram illustrating an example 400 of a frame structure in a wireless communication network, in accordance with the present disclosure. The frame structure shown in FIG. 4 may be used for time division duplexing (TDD) in a telecommunication system, such as LTE or NR. The transmission timeline may be partitioned into units of radio frames (sometimes referred to as frames). Each radio frame may have a predetermined duration (e.g., 10 milliseconds (ms)) and may be partitioned into a set of Z (Z≥1) subframes (e.g., with indices of 0 through Z−1). Each subframe may have a predetermined duration (e.g., 1 ms) and may include a set of slots (e.g., $2^m$ slots per subframe are shown in FIG. 4, where m is an index of a numerology used for a transmission, such as 0, 1, 2, 3, 4, or another number). Each slot may include a set of L symbol periods, sometimes referred to simply as "symbols." For example, each slot may include fourteen symbol periods (e.g., as shown in FIG. 4), seven symbol periods, or another number of symbol periods. In a case where the subframe includes two slots (e.g., when m=1), the subframe may include 2L symbol periods, where the 2L symbol periods in each subframe may be assigned indices of 0 through 2L−1.

In some examples, such as for communications employing TDD, slots may be semi-statically configured by a network node 110 as uplink slots (sometimes denoted with a "U"), downlink slots (sometimes denoted with a "D"), or flexible slots (sometimes denoted with an "F"). Uplink slots may be slots that are semi-statically configured for use for uplink communications (e.g., slots in which the symbols are reserved for uplink traffic). Downlink slots may be slots that are semi-statically configured for use for downlink communications (e.g., slots in which the symbols are reserved for downlink traffic). And flexible slots may be slots that include both uplink and downlink symbols and/or slots that may be used for either uplink traffic or downlink traffic. Put another way, semi-statically configured uplink slots may be associated with uplink (UL)-centric traffic, semi-statically configured downlink slots may be associated with downlink (DL)-centric traffic, and semi-statically configured flexible slots may be used for either UL-centric traffic or DL-centric traffic.

As indicated above, FIG. 4 is provided as an example. Other examples may differ from what is described with respect to FIG. 4.

FIG. 5 is a diagram illustrating an example 500 of a full duplex (FD) zone, a non-FD zone, and self-interference associated with FD communications, in accordance with the present disclosure. As shown, example 500 includes a network node (NN) (e.g., network node 110), a UE1 (e.g., UE 120), and a UE2 (e.g., another UE 120). In some aspects, the network node 110 may be capable of FD communication. FD communication may include a contemporaneous uplink and downlink communication using the same resources. For example, the network node may perform a DL transmission to a UE1 (shown by reference number 510) and may receive a UL transmission from a UE2 (shown by reference number 520) using the same frequency resources and at least partially overlapping in time.

As shown by reference number 530, the DL transmission from the NN may self-interfere with the UL transmission to the NN. This may be caused by a variety of factors, such as the higher transmit power for the DL transmission (as compared to the UL transmission) and/or radio frequency bleeding. Furthermore, as shown by reference number 540, the UL transmission to the NN from the UE2 may interfere with the DL transmission from the NN to the UE1, thereby diminishing DL performance of the UE1.

An FD zone is shown by reference number 550 and a non-FD zone is shown by reference number 560. "FD zone" may refer to a time period and/or a frequency region in which a wireless communication device (e.g., a network node 110, a UE 120, or a similar device) performs FD communication, and "non-FD zone" may refer to a time period and/or a frequency region in which a wireless communication device performs non-FD communication. The FD zone may be associated with higher self-interference, and therefore a lower signal-to-interference-plus-noise ratio (SINR), than the non-FD zone.

In some cases, a network node 110 may operate using a non-overlapping uplink and downlink sub band; e.g., an SBFD scheme. "SBFD scheme" may refer to an FD mode in which a slot provides bidirectional transmission on different sub-bands within a same component carrier. Example slot structures associated with SBFD schemes are described in more detail below in connection with FIG. 6.

As indicated above, FIG. 5 is provided as an example. Other examples may differ from what is described with respect to FIG. 5.

Figure 6:
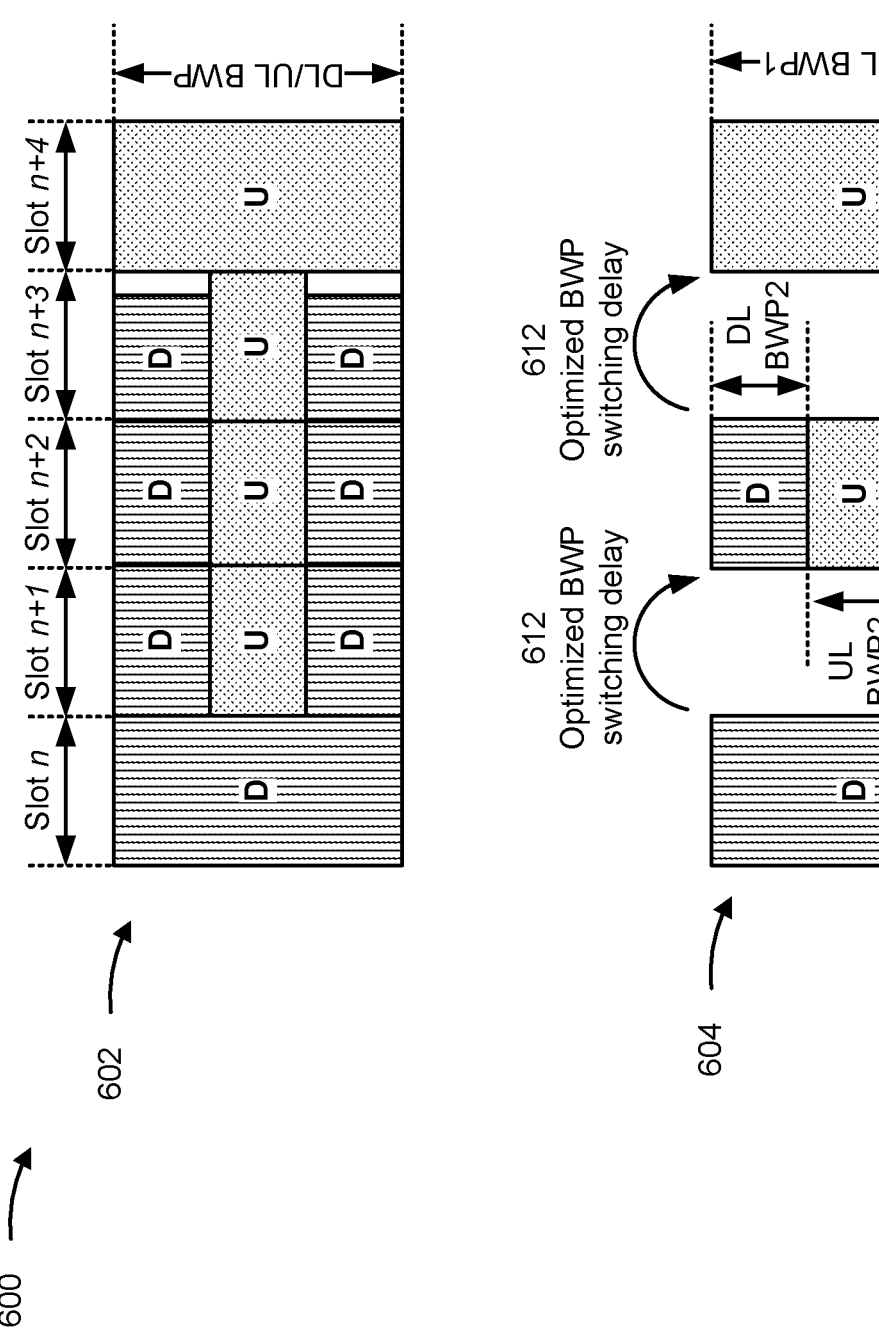
FIG. 6 is a diagram illustrating an example of slot structures associated with sub-band full duplex (SBFD) schemes, in accordance with the present disclosure.

FIG. 6 is a diagram illustrating an example 600 of slot structures associated with SBFD schemes, in accordance with the present disclosure. In some instances, the example slot structures shown in FIG. 6 may be associated with SBFD operation within a TDD carrier.

As shown by reference number 602, in some examples, SBFD operation may be associated with multiple sub-bands within a bandwidth part (BWP), with each sub-band being associated with one of uplink communications or downlink communications by a network node 110 or other wireless communication device. Put another way, the example slot structure shown in connection with reference number 602 may correspond to an SBFD scheme with a single config-ured downlink and uplink BWP pair with an aligned center frequency.

More particularly, in slot n, a wireless communication device (e.g., a network node 110) may operate in a downlink mode across an entire BWP (e.g., slot n may be semi-statically configured as a downlink slot, or D slot), and in slot n+4 the wireless communication device may operate in an uplink mode across the entire BWP (e.g., slot n may be semi-statically configured as an uplink slot, or U slot). In that regard, the wireless communication device may not be operating in an FD mode in slots n and n+4 (e.g., the wireless communication device may be operating in a half-duplex (HD) mode in slots n and n+4). In slots n+1, n+2, and n+3, however, the wireless communication device may be operating in an FD mode, and, more particularly, in an SBFD mode. More particularly, the wireless communication device may use a portion of the BWP (e.g., a sub-band) for communicating in the downlink and a portion of the BWP for communicating in the uplink. In the example shown in connection with reference number 602, the wireless com-munication device may utilize two noncontiguous portions of the BWP for communicating in the downlink, and one portion of the BWP for communicating in the uplink. In some examples, slots n+1, n+2, and n+3 may be semi-statically configured as downlink slots (e.g., D slots), but the network node 110 may nonetheless use a sub-band within the D slots (e.g., the sub-band indicated with a U) to schedule communications in the uplink.

In some other examples, as shown by reference number 604, SBFD operation may be associated with multiple BWPs, with each BWP being associated with one of uplink communications or downlink communications by a wireless communication device. Put another way, the example slot structure shown in connection with reference number 604 may correspond to an SBFD scheme having more than one configured downlink and uplink BWP with aligned or unaligned center frequencies.

More particularly, when operating in the SBFD mode shown in connection with reference number 604, a wireless communication device (e.g., a network node 110) may switch between BWPs when operating in a non-FD mode (e.g., an HD mode) and an FD mode. For example, as shown in connection with slot 606, which may be semi-statically configured as a D slot, the wireless communication device may communicate in the downlink using a first DL/UL BWP pair with aligned center frequencies, shown as DL/UL BWP1. However, when switching to an FD mode (e.g., a SBFD mode), the wireless communication device may use a different DL/UL BWP pair, with or without aligned center frequencies. More particularly, in the slot shown in connec-tion with reference number 608, the wireless communication device may communicate in the downlink in a first BWP, indicated as DL BWP2 (which may be two noncontiguous portions of the DL/UL BWP1), and the wireless communi-cation device may communicate in the uplink in a second BWP, indicated as UL BWP2 (which may be one portion of the DL/UL BWP 1).

When returning to half duplex operation, the wireless communication may switch back to the first DL/UL BWP pair (e.g., DL/UL BWP1). More particularly, as shown in connection with slot 610, which may be semi-statically configured as a U slot, the wireless communication device may communicate in the uplink using the first DL/UL BWP pair with aligned center frequencies (e.g., DL/UL BWP1). In some aspects, as shown by reference number 612, a delay (sometimes referred to as an optimized BWP switching delay) may be accounted for in a transmission timeline when switching between DL/UL BWP pairs in order to provide a period of time for the wireless communication device to switch between BWP configurations.

In some cases, a first wireless communication device (e.g., a network node 110) operating in an SBFD mode, such as by using one of the slot structures described above in connection with FIG. 6, may cause collisions at a second wireless communication device (e.g., a UE 120) that is operating in an HD mode and/or that does not have a capability to operate in the SBFD mode. Examples of certain collisions that may be caused by a wireless communication device operating in an SBFD mode are described in more detail below in connection with FIG. 7.

As indicated above, FIG. 6 is provided as an example. Other examples may differ from what is described with respect to FIG. 6.

Figure 7:
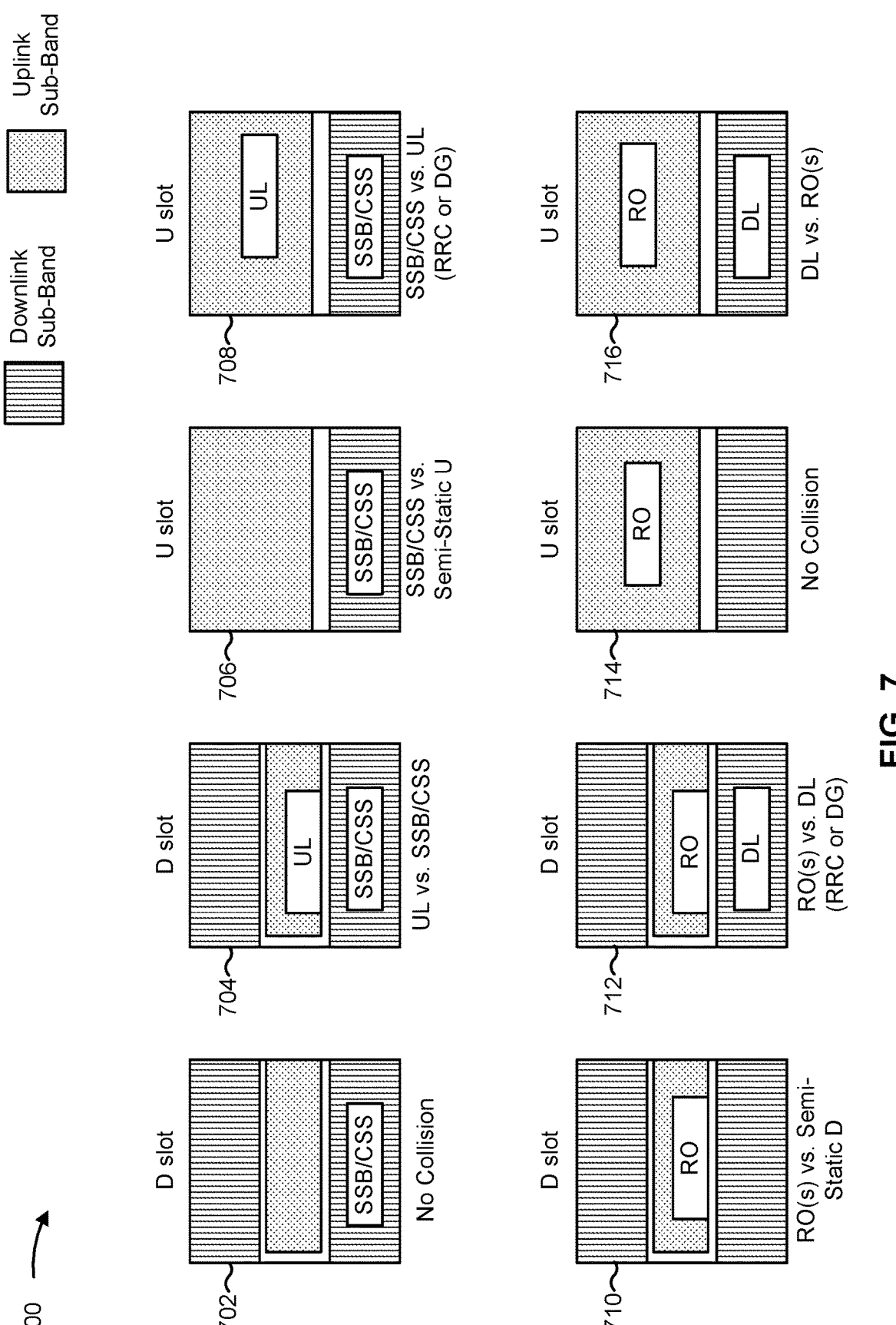
FIG. 7 is a diagram illustrating an example of collision scenarios for SBFD-aware UEs, in accordance with the present disclosure.

FIG. 7 is a diagram illustrating an example 700 of collision scenarios for SBFD-aware UEs, in accordance with the present disclosure.

In some examples, a network node 110 may be capable of operating in an SBFD mode, but a UE 120 in wireless communication with the network node 110 may not be capable of operating in the SBFD mode (e.g., the UE 120 may only have an HD capability), resulting in time-domain collisions of uplink and downlink communications at the UE 120. In such aspects, a UE 120 may be referred as an SBFD-aware half-duplex UE, which means that the UE 120 is not capable of full duplex operation but is aware that network node 110 operates in full duplex mode. More particularly, FIG. 7 depicts example collision scenarios that a UE 120 may face when the UE 120 is operating in an HD mode and the network node 110 is operating in an 1-D mode (e.g., an SBFD mode). For example, as shown by reference number 702, a UE 120 may be scheduled to receive an SSB communication in a downlink slot associated with a network node 110's SBFD operation. An SSB (sometimes referred to as a synchronization signal/physical broadcast channel (SS/PBCH) block) may carry information used for initial net-work acquisition and synchronization, such as a PSS, an SSS, a PBCH, and a PBCH DMRS. In some aspects, the network node 110 may transmit multiple SSBs on multiple corresponding beams, and the SSBs may be used for beam selection.

Additionally, or alternatively, and as also shown by ref-erence number 702, a UE 120 may be scheduled to receive a communication (e.g., a PDCCH communication) associ-ated with a CSS in a downlink slot associated with a network node 110's SBFD operation. "Search space" may refer to a set of possible locations (e.g., in time and/or frequency)

where a PDCCH may be located. A control resource set (CORESET) may include one or more search spaces, such as a UE-specific search space, a group-common search space, and/or a CSS. "CSS" may refer to a set of all possible PDCCH locations across all UEs. In some aspects, a CSS may correspond to a Type 0 PDCCH CSS (sometimes referred to as Type0-PDCCH), a Type 0A PDCCH CSS (sometimes referred to as Type0A-PDCCH), a Type 1 PDCCH CSS (sometimes referred to as Type 1-PDCCH), or a Type 2 PDCCH CSS (sometimes referred to as Type2-PDCCH). A Type 0 PDCCH CSS may be indicated using a system information (SI) radio network temporary identifier (RNTI) (SI-RNTI) for remaining minimum system information (RMSI) on a primary cell and/or may be associated with an SIB decoding use case, such as for decoding SIB1. A Type 0A PDCCH CSS may be indicated using an SI-RNTI on a primary cell and/or may also be associated with an SIB decoding use case, such as for decoding other SIBs (e.g., SIBs other than SIB1). A Type 1 PDCCH CSS may be indicated using a random access RNTI (RA-RNTI), a temporary cell RNTI (TC-RNTI), or a cell RNTI (C-RNTI) on a primary cell and/or may be associated with a message 2 (Msg2) and/or message 4 (Msg4) decoding in a RACH use case. A Type 2 PDCCH CSS may be indicated using a paging RNTI (P-RNTI) on a primary cell and/or may be associated with a paging decoding use case.

In the example depicted in connection with reference number 702, the UE 120 is not scheduled to transmit an uplink communication in the uplink sub-band of the downlink slot. Accordingly, in such examples, the UE 120 may receive the one of the SSB communication or the PDCCH communication associated with the CSS with little risk of collisions at the UE 120. Put another way, because the SSB communication or the PDCCH communication associated with the CSS is scheduled in a semi-static D slot, and because the UE 120 is not otherwise scheduled to transmit uplink traffic in an uplink sub-band of the D slot, there is little risk of collisions at the UE 120, notwithstanding that the network node 110 is operating in an SBFD mode in the slot. In some aspects, a downlink slot may correspond to a flexible slot (e.g., a semi-static F slot) that is dynamically indicated to be a downlink slot and/or that is similarly configured as the D slot shown in FIG. 7 (e.g., a semi-static F slot that is configured with similar uplink and downlink subbands as shown in connection with reference number 702).

However, as shown by reference number 704, in some other examples the UE 120 may be scheduled to transmit an uplink transmission in a sub-band of a downlink slot in which the UE 120 may be scheduled to receive the one of the SSB communication or the PDCCH communication associated with the CSS. Put another way, a network node 110 operating in an SBFD mode may schedule a UE 120 to transmit an uplink transmission in a semi-statically configured downlink slot. In such examples, there may be a time-domain collision at the UE 120 in the SBFD slot between communications in the downlink sub-band (e.g., the at least one of the SSB communication and/or the PDCCH communication associated with the CSS) and the uplink sub-band (e.g., the uplink transmission).

In some other examples, as indicated by reference number 706, a UE 120 may be scheduled to receive the SSB communication and/or the PDCCH communication associated with the CSS in a semi-statically configured uplink slot (shown in FIG. 7 as "semi-static U," which may correspond to a slot configured as an uplink slot (e.g., U slot) by an RRC TDD configuration parameter, such as one of tdd-UL-DL- ConfigurationCommon or tdd-UL-DL-ConfigurationDedicated). In some other aspects, the slot shown in connection with reference number 706 may be a semi-static F slot that is similarly configured as shown in FIG. 7. Similarly, shown by reference number 708, the UE 120 may be scheduled to transmit an uplink communication in an uplink slot in which the UE 120 is scheduled to receive the one of the SSB communication or the PDCCH communication associated with the CSS. In some cases, the uplink transmission may be a semi-static uplink transmission, such as a physical uplink control channel (PUCCH) communication, a physical uplink shared channel (PUSCH) communication, or a sounding reference signal (SRS) communication scheduled by a higher layer configuration (e.g., an RRC configuration). In some other cases, the uplink transmission may be a dynamic grant (DG) uplink transmission, such as a PUCCH communication, a PUSCH communication, or an SRS communication scheduled by downlink control information (DCI). Unlike the scenario shown in connection with reference number 702, each of the scenarios shown in connection with reference numbers 704, 706, and 708 may pose a risk of time-domain collisions at the UE 120.

As another example, in some cases a network node 110's SBFD operation may pose a risk of collision associated with an RO (sometimes referred to as a PRACH occasion) used by the UE 120 in connection with a random access procedure. "RO" may refer a transmission opportunity (e.g., time and frequency resources) for the UE 120 associated with a RACH procedure (e.g., time and frequency resources for transmitting a message associated with the RACH procedure). For example, as indicated by reference number 710, in some cases a UE 120 may be scheduled with an RO (e.g., may be scheduled with time and frequency resources for performing a random access procedure and/or for transmitting a communication associated with a random access procedure) in a semi-statically configured downlink slot (shown in FIG. 7 as "semi-static D," which may correspond to a slot configured as a downlink slot (e.g., D slot) by an RRC TDD configuration parameter, such as one of tdd-UL-DL-ConfigurationCommon or tdd-UL-DL-ConfigurationDedicated). In some other aspects, the slot shown in connection with reference number 710 may be a semi-static F slot that is similarly configured as shown in FIG. 7. Similarly, as shown by reference number 712, the UE 120 may be scheduled to receive a downlink transmission in a downlink slot in which the UE 120 may be scheduled with the RO. In some cases, the downlink transmission may a semi-static downlink transmission, such as a PDCCH communication, a physical downlink shared channel (PDSCH) communication, or a channel state information (CSI) reference signal (CSI-RS) reception scheduled by a higher layer configuration (e.g., an RRC configuration). In some other cases, the downlink transmission may be a DG downlink transmission, such as a PUSCH communication or CSI-RS reception scheduled by DCI. Both of the scenarios shown in connection with reference numbers 710 and 712 may pose a risk of collisions at the UE 120.

In some other examples, as shown by reference number 714, a UE 120 may be scheduled with an RO in an uplink slot. In this example, the UE 120 is not scheduled to receive a downlink communication in the downlink sub-band of the uplink slot. Accordingly, in such examples, the UE 120 may use the RO with little risk of collisions at the UE 120. However, as shown by reference number 716, in some examples the UE 120 may be scheduled to receive a downlink transmission in a downlink sub-band of the uplink slot in which the UE 120 may be scheduled with an RO. In such examples, there may be a time-domain collision at the UE 120 in the SBFD symbols between the downlink transmission in the downlink sub-band and uplink communications transmitted in the RO.

In some examples, the network node 110's SBFD operation may be transparent to the UE 120. In such cases, time and frequency locations of sub-bands for SBFD are unknown to the UE 120 and thus the UE 120 may operate in a similar manner as if the UE 120 were communicating with a network node 110 not operating in an SBFD mode. In that regard, the UE 120 may not be able to mitigate disruptions caused by one or more of the collision scenarios described above.

In some other cases, however, the network node 110's SBFD operation may be non-transparent to the UE 120 (e.g., the UE 120 may know of the network node 110's SBFD operation). When the network node 110's SBFD operation is non-transparent to the UE 120, the UE 120 is sometimes referred to as an SBFD-aware UE. In some examples, an SBFD-aware UE may be unaware of time and/or frequency locations of sub-bands for SBFD operation, but the SBFD-aware UE may nonetheless be aware that the network node 110 is operating in an SBFD mode. In some other examples, an SBFD-aware UE is aware of time locations of sub-bands for SBFD operation (e.g., a UE 120 may be indicated with a set of symbols and/or one or more slots in which the network node 110 is operating in an SBFD mode), but is unaware of frequency locations of sub-bands for SBFD operation. And in some other examples, an SBFD-aware UE is aware of both time and frequency locations of sub-bands for SBFD operation (e.g., a UE 120 may be indicated with a set of symbols and/or one or more slots in which the network node 110 is operating in an SBFD mode and/or a frequency location of the various sub-bands).

In some examples, an SBFD-aware UE may be in a poor position to mitigate disruptions caused by one or more of the collision scenarios described above. This may be because the SBFD-aware UE may not be configured or specified with one or more priorities and/or rules for dealing with the collision scenarios. Accordingly, whether a particular UE 120 receives or transmits a particular communication in a collision scenario may be left to UE 120 implementation. This may result in a UE 120 missing control information or other high-priority traffic from a network node 110, and/or a UE 120 selectively transmitting or receiving communications in a transparent manner to the network node 110, leading to increased communication errors; high power, computing, and communication resource consumption for purposes of correcting communication errors; increased latency and reduced throughput associated with communication channels between a network node 110 and a UE 120; and otherwise inefficient usage of network resources.

Some techniques and apparatuses described herein enable enhanced collision handling for SBFD-aware UEs. In some aspects, a UE 120 may receive, from a network node 110, an indication that the network node 110 is operating in an SBFD mode (e.g., the UE 120 may be an SBFD-aware UE), and the UE 120 may be configured, pre-configured, or otherwise specified with one or more collision-handling rules to perform a collision-handling procedure based at least in part on the indication. For example, in aspects in which a UE 120 is scheduled to receive one of an SSB communication or a PDCCH communication associated with a CSS in an SBFD set of symbols, the UE 120 may identify whether to receive the SSB communication or the PDCCH communication associated with the CSS in the SBFD set of symbols based at least in part on the indication.

And in aspects in which the UE 120 is configured with an RO in an SBFD set of symbols, the UE 120 may identify whether to transmit a communication in the RO based at least in part on the indication. As a result, the UE 120 and the network node 110 may communicate with more transparency and/or exchange control information or other high-priority traffic, thus communicating with decreased communication errors, leading to reduced power, computing, and communication resource consumption otherwise used for purposes of correcting communication errors; decreased latency and increased throughput associated with communication channels between the network node 110 and the UE 120; and otherwise more efficient usage of network resources.

As indicated above, FIG. 7 is provided as an example. Other examples may differ from what is described with respect to FIG. 7.

FIG. 8 is a diagram of an example 800 associated with collision handling for SBFD-aware UEs, in accordance with the present disclosure. As shown in FIG. 8, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIG. 8. In some aspects, the network node 110 may have a capability to operate in an SBFD mode and/or may be operating in an SBFD mode in the operations shown in FIG. 8, and/or the UE 120 may not have a capability to operate in an SBFD mode and/or may not be operating in an SBFD mode in the operations shown in FIG. 8. Moreover, in some aspects, the UE 120 may be an SBFD-aware UE, as is described in more detail below in connection with reference number 810. Aspects mentioned herein apply to UEs in a connected mode (e.g., RRC-connected UEs) in addition to UEs performing initial access (e.g., RRC-idle UEs) and to inactive UEs (e.g., RRC-inactive UEs).

As shown by reference number 805, the network node 110 may transmit, and the UE 120 may receive, configuration information. In some aspects, the UE 120 may receive the configuration information via one or more of RRC signaling, one or more MAC control elements (MAC-CEs), and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may indicate TDD configuration parameters semi-statically configuring certain symbols and/or slots as downlink symbols and/or slots (e.g., D slots), uplink symbols and/or slots (e.g., U slots), and/or flexible symbols and/or slots (e.g., F slots). For example, as described in more detail below in connection with reference number 810, in some aspects, the UE 120 may receive an indication that the network node 110 is operating in an SBFD mode in a set of symbols (e.g., an SBFD set of symbols). In such aspects, the configuration information may indicate that the SBFD set of symbols is associated with a semi-statically configured uplink slot and/or set of symbols, a semi-statically configured downlink slot and/or set of symbols, or a semi-statically configured flexible slot and/or set of symbols.

In some aspects, the configuration parameters may be associated with a TDD UL/DL common configuration information element (IE) (e.g., tdd-UL-DL-ConfigurationCommon) or a TDD UL/DL dedicated configuration IE (e.g., tdd-UL-DL-ConfigurationDedicated). The TDD UL/DL common configuration IE (e.g., tdd-UL-DL-Configuration-Common) may provide all UEs in a cell with a cell-specific DL/UL pattern, and may be either broadcasted in a system information block (SIB), such as SIB1, or else configured to the UE 120 using dedicated RRC signaling. The TDD UL/DL dedicated configuration IE (e.g., tdd-UL-DL-ConfigurationDedicated) may be UE-specific (e.g., transmitted to a specific UE 120) and may further modify and/or allocate any flexible slots and symbols configured by the TDD UL/DL common configuration IE (e.g., tdd-UL-DL-ConfigurationCommon). The TDD UL/DL dedicated configuration IE (e.g., tdd-UL-DL-ConfigurationDedicated) may be configured to the UE 120 using dedicated RRC signaling. The configuration information may include additional communication parameters. In some aspects, the configuration information may include an indication that network node 110 is operating in an SBFD mode, which is described in more detail below in connection with reference number 810.

The UE 120 may configure itself based at least in part on the configuration information. In some aspects, the UE 120 may be configured to perform one or more operations described herein based at least in part on the configuration information.

As shown by reference number 810, the network node 110 may transmit, and the UE 120 may receive, an indication that the network node 110 is operating in an SBFD mode in a set of symbols (e.g., an SBFD set of symbols), shown as the SBFD set of symbols indicated by reference number 815. In that regard, based at least in part on the indication, the UE 120 may be an SBFD-aware UE 120. In some aspects, the indication may indicate only a time location of SBFD operation (e.g., the indication may indicate a time location, but not a frequency location, of the SBFD set of symbols in which the network node 110 is operating in the SBFD mode). In some other aspects, the indication may indicate both a time location and a frequency location of SBFD operation (e.g., the indication may indicate a time location and a frequency location of the UL and DL sub-bands in the SBFD set of symbols in which the network node 110 is operating in the SBFD mode). In some aspects, the indication that the network node 110 is operating in the SBFD mode in the set of symbols may be transmitted by the network node 110, and received by the UE 120, in a broadcast message, such as in an SIB (e.g., SIB1). Additionally, or alternatively, the indication that the network node 110 is operating in the SBFD mode in the set of symbols may be transmitted by the network node 110, and received by the UE 120, via an RRC message, such as an RRC configuration message or an RRC reconfiguration message. In that regard, the indication may be provided as part of (e.g., included in a same RRC message as) the configuration information described above in connection with reference number 805. The RRC message could be either a cell-specific or a UE-dedicated configuration.

In some aspects, the SBFD set of symbols, shown in FIG. 8 using reference number 815, may be associated with uplink symbols and/or an uplink slot (e.g., a U slot). More particularly, in some aspects, set of symbols in which the network node 110 is operating in an SBFD mode (e.g., SBFD set of symbols) may be indicated as uplink or flexible symbols by TDD UL/DL configuration information, such as by one of the TDD UL/DL dedicated configuration IE (e.g., tdd-UL-DL-ConfigurationDedicated) or the TDD UL/DL dedicated configuration IE (e.g., tdd-UL-DL-Configuration-Dedicated). In some other aspects, the set of symbols in which the network node 110 is operating in an SBFD mode may be indicated as downlink or flexible symbols by TDD UL/DL configuration information. Additionally, or alternatively, in some aspects, the set of symbols may be associated with the reception of an SSB, sometimes referred to as an SS/PBCH block, and/or may be associated with a CSS (e.g., the set of symbols may be used for reception of a PDCCH communication associated with a CSS).

As shown by reference number 820, in some aspects the network node 110 may transmit, and the UE 120 may receive, at least one of configuration information or DCI scheduling an uplink transmission in the set of symbols (e.g., the SBFD set of symbols indicated by reference number 815). Put another way, in some aspects, the UE 120 may be configured by a higher layer parameter for uplink transmission in the set of symbols, and/or the UE 120 may be dynamically scheduled by DCI for uplink transmission in the set of symbols.

As shown by reference number 825, the UE 120 may identify how to handle a potential or actual collision in the set of symbols due to the network node 110's SBFD operation in the set of symbols. More particularly, as described above in connection with FIG. 7, the network node 110's SBFD operation may result in various collision scenarios at the HD UE 120, such as when an SSB communication and/or a PDCCH communication associated with a CSS is scheduled to be received in a downlink sub-band in a semi-static uplink slot (as described above in connection with reference numbers 706 and 708), or when an SSB communication and/or a PDCCH communication associated with a CSS is scheduled to be received in a semi-static downlink slot and an uplink transmission is scheduled to be transmitted in an uplink sub-band of the semi-statically configured downlink slot (as described above in connection with reference number 702), among other examples. Accordingly, in the operations shown in connection with reference number 825, the UE 120 may identify whether to receive at least one of an SSB communication (e.g., an SS/PBCH communication) or a PDCCH communication associated with a CSS in the set of symbols (e.g., the SBFD set of symbols indicated by reference number 815) based at least in part on the indication.

As shown by reference numbers 830 and 835, in some aspects, the UE 120 may receive the SSB communication and/or the PDCCH communication associated with the CSS in the SBFD set of symbols, or the UE 120 may transmit the uplink communication in the SBFD set of symbols based at least in part on the identification of whether to receive the at least one of the SSB communication (e.g., an SS/PBCH communication) or the PDCCH communication associated with the CSS in the SBFD set of symbols. For example, in some aspects, the SBFD set of symbols may be associated with an uplink slot (e.g., the UE 120 may have received configuration information, such as tdd-UL-DL-ConfigurationCommon and/or tdd-UL-DL-ConfigurationDedicated, indicating that the set of symbols is associated with an uplink slot and/or a semi-static flexible slot that is dynamically indicated as an uplink slot). Moreover, in some aspects, the UE 120 may be configured, preconfigured, or specified to always receive an SSB communication and/or a PDCCH communication associated with a CSS when transmitted in an SBFD set of symbols associated with an uplink slot. Accordingly, in such aspects, the UE 120 may receive the at least one of the SSB communication or the PDCCH communication associated with the CSS based at least in part on the configuration information indicating that the SBFD set of symbols is associated with the uplink slot.

In some other aspects, the UE 120 may be configured, preconfigured, or specified to receive an SSB communication and/or a PDCCH communication associated with a CSS when transmitted in an SBFD set of symbols associated with an uplink slot only when the SBFD set of symbols are associated with a serving cell. For example, the configuration information described above in connection with reference number 805 may include serving cell configuration information indicating a location of an SSB associated with the serving cell. For example, the location of the SSB associated with the serving cell may be indicated in an SIB message (e.g., SIB1) via an SSB position in burst parameter (sometimes referred to as ssb-PositionInBurst). Additionally, or alternatively, the location of the SSB associated with the serving cell may be indicated in an RRC message (e.g., in a ServingCellConfigCommon IE) via an SSB position in burst parameter (e.g., ssb-PositionInBurst). Accordingly, based at least in part on the at least one of the SSB communication or the PDCCH communication associated with the CSS being associated with a serving cell (e.g., as indicated by ssb-PositionInBurst), the UE 120 may identify that the SSB communication and/or the PDCCH communication associated with the CSS should be received in the SBFD set of symbols, and thus receive the at least one of the SSB communication or the PDCCH communication associated with the CSS, as shown by reference number 830.

Similarly, the UE 120 may be configured, preconfigured, or specified to refrain from receiving an SSB communication and/or a PDCCH communication associated with a CSS when the SSB communication and/or the PDCCH communication associated with the CSS is not associated with a serving cell, such as when the SSB communication and/or the PDCCH communication associated with the CSS is transmitted outside an SSB measurement timing configuration (SMTC) window associated with a serving cell. In some aspects, the configuration information described above in connection with reference number 805 may indicate resources associated with the SMTC window of the serving cell, such as in an SIB message (e.g., SIB1) via an SSB position in burst parameter (e.g., ssb-PositionInBurst), and/or an RRC message (e.g., ServingCellConfigCommon) via the SSB position in burst parameter (e.g., ssb-PositionInBurst). Accordingly, based at least in part on the at least one of the SSB communication or the PDCCH communication associated with the CSS not being associated with a serving cell (e.g., transmitted outside of the SMTC window, as indicated by ssb-PositionInBurst), the UE 120 may identify that the SSB communication and/or the PDCCH communication associated with the CSS should not be received in the SBFD set of symbols and thus refrain from receiving the communication shown in connection with reference number 830.

Additionally, or alternatively, the UE 120 may be configured, preconfigured, or specified to always refrain from receiving an SSB communication and/or a PDCCH communication associated with a CSS when the SSB communication and/or the PDCCH communication associated with the CSS is scheduled within a semi-static uplink slot (e.g., a slot indicated as a U slot by tdd-UL-DL-Configuration-Common and/or tdd-UL-DL-ConfigurationDedicated, or similar configuration information, as described above in connection with reference numbers 706 and 708, and/or a semi-static flexible slot that is dynamically indicated as an uplink slot). In such aspects, when the SSB communication and/or the PDCCH communication associated with the CSS is scheduled to be received in a U slot, the UE 120 may identify that the SSB communication and/or the PDCCH communication associated with the CSS should not be received in the SBFD set of symbols and thus refrain from receiving the communication shown in connection with reference number 830.

Moreover, as described above in connection with reference number 820, in some aspects the UE 120 may be scheduled to transmit an uplink transmission in the set of symbols (e.g., in the SBFD set of symbols indicated by reference number 815), similar to uplink transmission as described in connection with the collision scenarios shown by reference numbers 704 and 708. In such aspects, the UE 120 may be configured, preconfigured, or specified, to perform, in the SBFD set of symbols, one of receiving the SSB communication and/or the PDCCH communication associated with the CSS (as shown by reference number 830) or transmitting the uplink transmission (as shown by reference number 835), and refrain from performing the other one of receiving the SSB communication and/or the PDCCH communication associated with the CSS or transmitting the uplink transmission.

More particularly, in some aspects the UE 120 may be configured, preconfigured, or specified to always receive the SSB communication and/or the PDCCH communication associated with the CSS, such as for purposes of ensuring that the UE 120 receives control information or similar high-priority communications. In such aspects, based at least in part on the at least one of the configuration information or the DCI scheduling the uplink transmission in the set of symbols, the UE 120 may receive the SSB communication and/or the PDCCH communication associated with the CSS in the SBFD set of symbols (as shown by reference number 830), and refrain from transmitting the uplink transmission in the SBFD set of symbols (e.g., refrain from transmitting the message shown in connection with reference number 835).

In some other aspects, the UE 120 may be configured, preconfigured, or specified to receive the SSB communication and/or the PDCCH communication associated with the CSS when the SSB communication and/or the PDCCH communication associated with the CSS is associated with the serving cell, but to otherwise transmit the uplink transmission. For example, the UE 120 may receive the SSB communication and/or the PDCCH communication associated with the CSS in the SBFD set of symbols (as shown by reference number 830), and refrain from transmitting the uplink transmission in the SBFD set of symbols (e.g., refrain from transmitting the message shown in connection with reference number 835), based at least in part on configuration information (e.g., ssb-PositionInBurst indicated in SIB1 and/or ServingCellConfigCommon) indicating that the SSB communication and/or the PDCCH communication associated with the CSS is associated with the serving cell. Alternatively, the UE 120 may transmit the uplink transmission in the SBFD set of symbols, and refrain from receiving the at least one of the SSB communication or the PDCCH communication associated with the CSS in the SBFD set of symbols, based at least in part on configuration information indicating that the SSB communication and/or the PDCCH communication associated with the CSS is not associated with the serving cell. For example, the configuration information (e.g., ssb-PositionInBurst indicated in SIB1 and/or ServingCellConfigCommon) may indicate that the SSB communication and/or the PDCCH communication associated with the CSS is being transmitted outside an SMTC window associated with a serving cell, and thus the UE 120 may transmit the uplink transmission (as shown by reference number 835) and refrain from receiving the SSB communication and/or the PDCCH communication associated with the CSS (e.g., refrain from receiving the message shown in connection with reference number 830).

In some aspects, the UE 120 may be configured, preconfigured, or specified to always transmit the uplink transmission and refrain from receiving the SSB communication and/or the PDCCH communication associated with the CSS when the SSB communication and/or the PDCCH communication associated with the CSS is scheduled in a slot indicated as an uplink slot. In such aspects, based at least in part on the UE 120 receiving configuration information indicating that the SBFD set of symbols is associated with an uplink slot (e.g., tdd-UL-DL-ConfigurationCommon and/or tdd-UL-DL-ConfigurationDedicated indicating that the set of symbols is associated with a U slot, and/or a semi-static flexible slot that is dynamically indicated as an uplink slot), the UE 120 may transmit the uplink transmission in the SBFD set of symbols (as shown by reference number 835), and refrain from receiving the at least one of the SSB communication or the CSS communication in the SBFD set of symbols (e.g., refrain from transmitting the message shown in connection with reference number 830).

Based at least in part on an SBFD-aware UE 120 being configured, preconfigured, or specified to handle one or more collision scenarios as described above, the UE 120 and/or the network node 110 may communicate in a more transparent manner and/or conserve computing, power, network, and/or communication resources that may have otherwise been consumed by communications performed by a non-SBFD aware UE 120 and/or communications performed by an SBFD-aware UE 120 failing to prioritize high-priority communications such as control communications or similar messages. For example, based at least in part on an SBFD-aware UE 120 being configured, preconfigured, or specified to handle one or more collision scenarios as described above, the UE 120 and the network node 110 may communicate with a reduced error rate, which may conserve computing, power, network, and/or communication resources that may have otherwise been consumed to detect and/or correct communication errors.

As indicated above, FIG. 8 is provided as an example. Other examples may differ from what is described with respect to FIG. 8.

Figure 9:
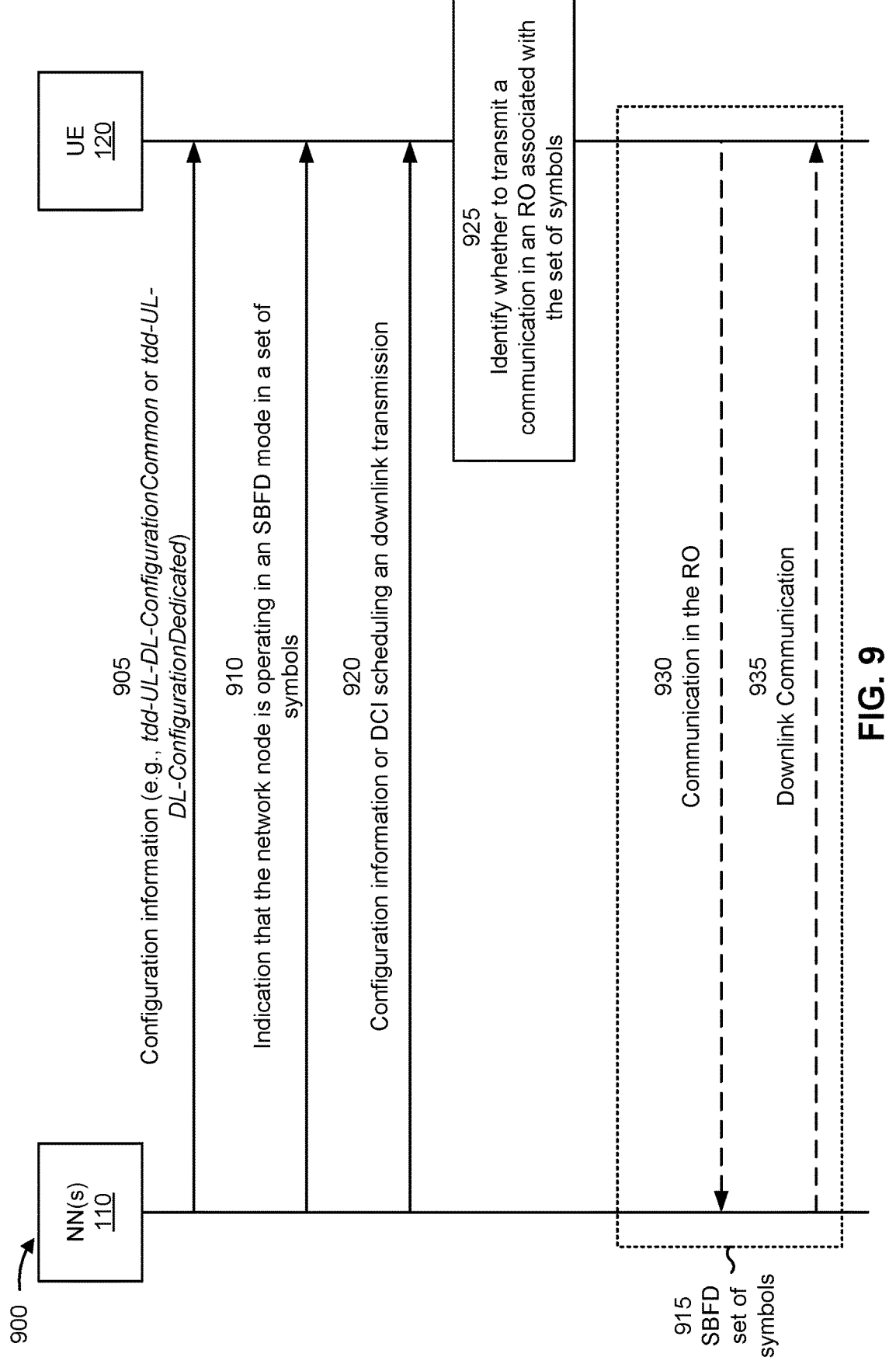
FIG. 9 is a diagram of an example associated with collision handling for SBFD-aware UEs, in accordance with the present disclosure.

FIG. 9 is a diagram of an example 900 associated with collision handling for SBFD-aware UEs, in accordance with the present disclosure. As shown in FIG. 9, a network node 110 (e.g., a CU, a DU, and/or an RU) may communicate with a UE 120. In some aspects, the network node 110 and the UE 120 may be part of a wireless network (e.g., wireless network 100). The UE 120 and the network node 110 may have established a wireless connection prior to operations shown in FIG. 9. In some aspects, the network node 110 may have a capability to operate in an SBFD mode and/or may be operating in an SBFD mode in the operations shown in FIG. 9, and/or the UE 120 may not have a capability to operate in an SBFD mode and/or may not be operating in an SBFD mode in the operations shown in FIG. 9. Moreover, in some aspects, the UE 120 may be an SBFD-aware UE, as is described in more detail below in connection with reference number 910. Aspects mentioned herein apply to UEs in a connected mode (e.g., RRC-connected UEs) in addition to UEs performing initial access (e.g., RRC-idle UEs) and to inactive UEs (e.g., RRC-inactive UEs).

As shown by reference number 905, the network node 110 may transmit, and the UE 120 may receive, configuration information. In some aspects, the UE 120 may receive the configuration information via one or more of RRC signaling, one or more MAC-CEs, and/or DCI, among other examples. In some aspects, the configuration information may include an indication of one or more configuration parameters (e.g., already known to the UE 120 and/or previously indicated by the network node 110 or other network device) for selection by the UE 120, and/or explicit configuration information for the UE 120 to use to configure the UE 120, among other examples.

In some aspects, the configuration information may indicate TDD configuration parameters semi-statically configuring certain symbols and/or slots as downlink symbols and/or slots (e.g., D slots), uplink symbols and/or slots (e.g., U slots), and/or flexible symbols and/or slots (e.g., F slots). For example, as described in more detail below in connection with reference number 910, in some aspects the UE 120 may receive an indication that the network node 110 is operating in an SBFD mode in a set of symbols. In such aspects, the configuration information may indicate that the SBFD set of symbols is associated with a semi-statically configured uplink slot and/or set of symbols, a semi-statically configured downlink slot and/or set of symbols, or a semi-statically configured flexible slot and/or set of symbols. In a similar manner as described above in connection with reference number 805, the configuration parameters may be associated with a TDD UL/DL IE (e.g., tdd-UL-DL-ConfigurationCommon) or a TDD UL/DL dedicated configuration IE (e.g., tdd-UL-DL-ConfigurationDedicated). The configuration information may include additional communication parameters. In some aspects, the configuration information may include an indication that network node 110 is operating in an SBFD mode, which is described in more detail below in connection with reference number 910.

The UE 120 may configure itself based at least in part on the configuration information. In some aspects, the UE 120 may be configured to perform one or more operations described herein based at least in part on the configuration information.

As shown by reference number 910, the network node 110 may transmit, and the UE 120 may receive, an indication that the network node 110 is operating in an SBFD mode in a set of symbols, shown as the SBFD set of symbols indicated by reference number 915. In that regard, based at least in part on the indication, the UE 120 may be an SBFD-aware UE 120. In some aspects, the indication may indicate only a time location of SBFD operation (e.g., the indication may indicate a time location, but not a frequency location, of the set of symbols in which the network node 110 is operating in the SBFD mode). In some other aspects, the indication may indicate both a time location and a frequency location of SBFD operation (e.g., the indication may indicate a time location and a frequency location of the set of symbols in which the network node 110 is operating in the SBFD mode). In some aspects, the indication that the network node 110 is operating in the SBFD mode in the set of symbols may be transmitted by the network node 110, and received by the UE 120, in a broadcast message, such as in an SIB (e.g., SIB1). Additionally, or alternatively, the indication that the network node 110 is operating in the SBFD mode in the set of symbols may be transmitted by the network node 110, and received by the UE 120, via an RRC message, such as an RRC configuration message or an RRC reconfiguration message. In that regard, the indication may be provided as part of (e.g., included in a same RRC message as) the configuration information described above in connection with reference number 805.

In some aspects, the set of symbols, shown in FIG. 9 using reference number 915, may be associated with downlink symbols and/or a downlink slot (e.g., a semi-static D slot and/or a semi-static F slot that is dynamically indicated as a downlink slot). More particularly, in some aspects, the set of symbols in which the network node 110 is operating in an SBFD mode may be indicated as downlink symbols by TDD UL/DL configuration information, such as by one of the TDD UL/DL dedicated configuration IE (e.g., tdd-UL-DL-ConfigurationDedicated) or the TDD UL/DL dedicated configuration IE (e.g., tdd-UL-DL-ConfigurationDedicated). In some other aspects, the set of symbols in which the network node 110 is operating in an SBFD mode may be indicated as uplink or flexible symbols by TDD UL/DL configuration information. Additionally, or alternatively, in some aspects, the set of symbols may be associated with an RO (e.g., the set of symbols may be associated with time and/or frequency resources scheduled for use by the UE 120 to transmit a RACH message or similar communication associated with the random access procedure).

As shown by reference number 920, in some aspects the network node 110 may transmit, and the UE 120 may receive, at least one of configuration information or DCI scheduling a downlink transmission in the SBFD set of symbols (e.g., the set of symbols indicated by reference number 915). Put another way, in some aspects, the UE 120 may be configured by a higher layer parameter for downlink reception in the SBFD set of symbols (e.g., the set of SBFD symbols indicated by reference number 915), and/or the UE 120 may be dynamically scheduled by DCI for downlink reception in the SBFD set of symbols. As described above in connection with the collision scenarios indicated by reference numbers 712 and 716, the downlink transmission may be associated with a PDCCH communication, a CSI-RS reception, a PDSCH communication, or a similar downlink communication.

As shown by reference number 925, the UE 120 may identify how to handle a potential or actual collision in the SBFD set of symbols due to the network node 110's SBFD operation in the set of symbols. More particularly, as described above in connection with FIG. 7, the network node 110's SBFD operation may result in various collision scenarios at the HD UE 120, such as when an RO is scheduled in an uplink sub-band in a semi-statically configured downlink slot (as described above in connection with reference numbers 710 and 712), or else a similarly configured flexible slot, and/or when an RO is scheduled in a semi-statically configured uplink slot and a downlink transmission is scheduled to be received in a downlink sub-band of the semi-statically configured uplink slot (as described above in connection with reference number 716), among other examples. Accordingly, in the operations shown in connection with reference number 925, the UE 120 may identify whether to transmit a communication in an RO associated with the set of symbols (e.g., the SBFD symbols indicated by reference number 915) based at least in part on the indication.

In some aspects, an RO may be associated with a gap (sometimes referred to as $N_{gap}$), which may be a number of symbols before an RO used to switch between transmission modes. Put another way, $N_{gap}$ may refer to a number of symbols during which a UE 120 is switching between a downlink reception mode and an uplink transmission mode, and thus may be a period of time during which the UE 120 is not capable of receiving downlink communications. Accordingly, for purposes of the various collision scenarios associated with the RO, the UE 120 may determine that a collision or potential collision exists when a valid RO and $N_{gap}$ symbols before the RO occur within a semi-static downlink slot and/or when a valid RO and $N_{gap}$ symbols before the RO overlap with an RRC-scheduled or DG-scheduled downlink transmission.

As shown by reference numbers 930 and 935, the UE 120 may transmit a communication (e.g., a communication associated with a random access procedure) in an RO associated with the SBFD set of symbols, or the UE 120 may receive the downlink transmission in the SBFD set of symbols, based at least in part on the identification of whether to transmit the communication in the RO. For example, in some aspects, the set of symbols may be associated with a downlink slot (e.g., the UE 120 may have received configuration information, such as tdd-UL-DL-ConfigurationCommon and/or tdd-UL-DL-ConfigurationDedicated, indicating that the set of symbols is associated with a downlink slot or a flexible slot that is dynamically indicated to be a downlink slot). Moreover, in some aspects, the UE 120 may be configured, preconfigured, or specified to always transmit the communication in the RO when transmitted in an SBFD set of symbols associated with a downlink slot. Accordingly, in such aspects, the UE 120 may transmit the communication in the RO (as shown by reference number 930) based at least in part on the configuration information indicating that the SBFD set of symbols is associated with the downlink slot.

In some other aspects, the UE 120 may be configured, preconfigured, or specified to transmit certain types of communications in the RO when being the RO is associated with an SBFD set of symbols associated with a downlink slot. For example, the UE 120 may be configured, preconfigured, or specified to transmit communications associated with one of a contention based random access (CBRA) procedure or a contention free random access (CI-RA) procedure, but not the other one of the CBRA procedure or the CERA procedure. More particularly, in some aspects, the UE 120 may transmit the communication in the RO (as shown by reference number 930) based at least in part on the communication being associated with a CBRA procedure. In some other aspects, the UE may transmit the communication in the RO (as shown by reference number 930) based at least in part on the communication being associated with a CI-RA procedure.

In some aspects, when a UE 120 is indicated with a valid RO in a downlink slot, the UE 120 may be configured, preconfigured, or specified to treat the set of symbols as flexible symbols, and thus transmit the communication in the RO (as shown by reference number 930). In some other aspects, the UE 120 may not expect to be indicated with an RO in a downlink slot. Thus, in such aspects, the UE 120 may identify that an error case has occurred based at least in part on the indication that the network node is operating in the SBFD mode associated with the set of symbols and the configuration information indicating that the SBFD set of symbols is associated with the downlink slot (e.g., the UE 120 may refrain from transmitting the communication shown in connection with reference number 830 based at least in part on identifying that an error case has occurred).

Moreover, as described above in connection with reference number 920, in some aspects the UE 120 may be scheduled to receive a downlink transmission in the set of symbols (e.g., in the SBFD set of symbols indicated by reference number 915), similar to the collision scenarios described above in connection with reference numbers 712 and 716. In such aspects, the UE 120 may be configured, preconfigured, or specified, to perform, in the SBFD set of symbols, one of transmitting the communication in the RO associated with the set of symbols (as shown by reference number 930) or receiving the downlink transmission (as shown by reference number 935), and refrain from performing the other one of transmitting the communication in the RO associated with the SBFD set of symbols or receiving the downlink transmission.

More particularly, in some aspects the UE 120 may be configured, preconfigured, or specified to always drop the downlink transmission (e.g., refrain from receiving the communication shown in connection with reference number 935) and thus transmit the communication in the RO associated with the SBFD set of symbols (e.g., the UE 120 may refrain from receiving a PDCCH communication, a CSI-RS reception, a PDSCH communication, or a similar communication if a slot associated with the reception would overlap with any symbol of the SBFD set of symbols associated with a RO). Put another way, in some aspects, the UE 120 may transmit the communication in the RO associated with the SBFD set of symbols, and refrain from receiving the downlink transmission in the SBFD set of symbols, based at least in part on the at least one of configuration information or the DCI scheduling the downlink transmission in the SBFD set of symbols.

In some aspects, the UE 120 may be configured, preconfigured, or specified to receive a downlink transmission when the UE 120 does not need to transmit a random access communication at the SBFD set of symbols. For example, the UE 120 may receive the downlink transmission in the SBFD set of symbols (as shown by reference number 935), and refrain from transmitting the communication in the RO associated with the SBFD set of symbols (e.g., refrain from transmitting the communication shown by reference number 930), based at least in part on the UE 120 not having a random access communication to transmit in the SBFD set of symbols. In some aspects, the UE 120 may be configured, preconfigured, or specified to receive a DG downlink transmission in the SBFD set of symbols based at least in part on the UE 120 not having a random access communication to transmit in the SBFD set of symbols. For example, the UE 120 may be configured, preconfigured, or specified to receive a downlink signal and/or channel (e.g., a CSI-RS, a PDSCH, or the like) scheduled by a DCI communication if the UE 120 does not need to transmit a random access communication (e.g., a PRACH communication) at the SBFD set of symbols, and to otherwise transmit the random access communication (e.g., transmit the communication in the RO).

In some aspects, the UE 120 may be configured, preconfigured, or specified to receive a downlink transmission based at least in part on a type of downlink transmission being transmitted by the network node 110. For example, the UE 120 may be configured, preconfigured, or specified to receive a downlink transmission associated with a PDCCH monitoring occasion. More particularly, in some aspects, the UE 120 may receive the downlink transmission in the SBFD set of symbols (as shown by reference number 935), and refrain from transmitting the communication in the RO associated with the SBFD set of symbols (e.g., refrain from transmitting the communication shown by reference number 930), based at least in part on the SBFD set of symbols being associated with a monitoring occasion associated with a PDCCH communication. In some aspects, whether the UE 120 receives the downlink transmission associated with the PDCCH monitoring occasion may be based at least in part on whether the UE 120 has a random access communication to transmit in the RO. For example, in aspects in which the UE 120 needs to transmit a random access communication, the UE 120 may transmit the communication in the RO associated with the SBFD set of symbols and refrain from receiving the downlink transmission in the SBFD set of symbols. And in aspects in which the UE 120 does not need to transmit a random access communication, the UE 120 may receive the downlink transmission in the SBFD set of symbols and refrain from transmitting a communication in the RO associated with the SBFD set of symbols.

Based at least in part on an SBFD-aware UE 120 being configured, preconfigured, or specified to handle one or more collision scenarios as described above, the UE 120 and/or the network node 110 may communicate with increased transparency and conserve computing, power, network, and/or communication resources that may have otherwise been consumed by communications performed by a non-SBFD aware UE 120 and/or communications performed by an SBFD-aware UE 120 failing to prioritize high-priority communications such as control communications or similar messages. For example, based at least in part on an SBFD-aware UE 120 being configured, preconfigured, or specified to handle one or more collision scenarios as described above, the UE 120 and the network node 110 may communicate with a reduced error rate, which may conserve computing, power, network, and/or communication resources that may have otherwise been consumed to detect and/or correct communication errors.

As indicated above, FIG. 9 is provided as an example. Other examples may differ from what is described with respect to FIG. 9.

Figure 10:
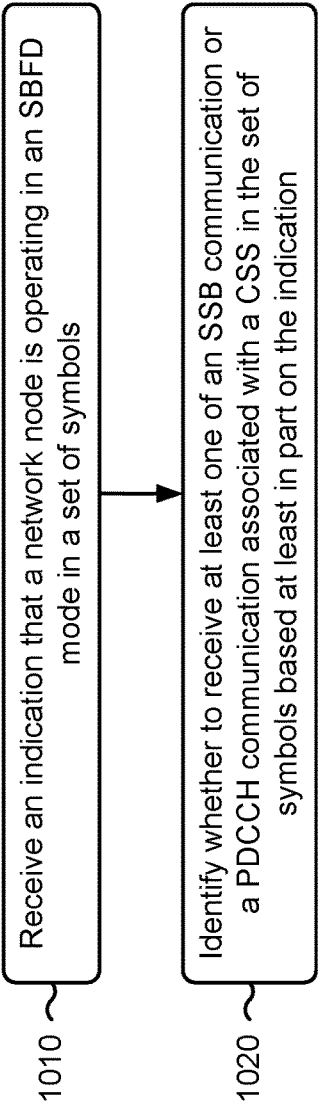
FIG. 10 is a diagram illustrating an example process performed, for example, by a UE, in accordance with the present disclosure.

FIG. 10 is a diagram illustrating an example process 1000 performed, for example, by a UE, in accordance with the present disclosure. Example process 1000 is an example where the UE (e.g., UE 120) performs operations associated with collision handling for SBFD-aware UEs.

As shown in FIG. 10, in some aspects, process 1000 may include receiving an indication that a network node is operating in an SBFD mode in a set of symbols (block 1010). For example, the UE (e.g., using communication manager 140 and/or reception component 1202, depicted in FIG. 12) may receive an indication that a network node is operating in an SBFD mode in a set of symbols, as described above.

As further shown in FIG. 10, in some aspects, process 1000 may include identifying whether to receive at least one of an SSB communication or a PDCCH communication associated with a CSS in the set of symbols based at least in part on the indication (block 1020). For example, the UE (e.g., using communication manager 140, identification component 1208, and/or SBFD component 1210 depicted in FIG. 12) may identify whether to receive at least one of an SSB communication or a PDCCH communication associated with a CSS in the set of symbols based at least in part on the indication, as described above.

Process 1000 may include additional aspects, such as any single aspect or any combination of aspects described below and/or in connection with one or more other processes described elsewhere herein.

In a first aspect, the indication is received via at least one of a broadcast message or a radio resource control message.

In a second aspect, alone or in combination with the first aspect, process 1000 includes receiving configuration information indicating that the set of symbols is associated with an uplink slot.

In a third aspect, alone or in combination with one or more of the first and second aspects, process 1000 includes receiving the at least one of the SSB communication or the PDCCH communication associated with the CSS based at least in part on the configuration information indicating that the set of symbols is associated with the uplink slot.

In a fourth aspect, alone or in combination with one or more of the first through third aspects, process 1000 includes receiving the at least one of the SSB communication or the PDCCH communication associated with the CSS based at least in part on the at least one of the SSB communication or the PDCCH communication associated with the CSS being associated with a serving cell.

In a fifth aspect, alone or in combination with one or more of the first through fourth aspects, process 1000 includes refraining from receiving the SSB communication or the PDCCH communication associated with the CSS based at least in part on the at least one of the SSB communication or the PDCCH communication associated with the CSS being transmitted outside an SSB measurement timing configuration window associated with a serving cell.

In a sixth aspect, alone or in combination with one or more of the first through fifth aspects, process 1000 includes refraining from receiving the at least one of the SSB communication or the PDCCH communication associated with the CSS based at least in part on the configuration information indicating that the set of symbols is associated with the uplink slot.

In a seventh aspect, alone or in combination with one or more of the first through sixth aspects, process 1000 includes receiving at least one of configuration information or DCI scheduling an uplink transmission in the set of symbols.

In an eighth aspect, alone or in combination with one or more of the first through seventh aspects, process 1000 includes receiving the at least one of the SSB communication or the PDCCH communication associated with the CSS in the set of symbols, and refraining from transmitting the uplink transmission in the set of symbols, based at least in part on the at least one of the configuration information or the DCI scheduling the uplink transmission in the set of symbols.

In a ninth aspect, alone or in combination with one or more of the first through eighth aspects, process 1000 includes receiving the at least one of the SSB communication or the PDCCH communication associated with the CSS in the set of symbols, and refraining from transmitting the uplink transmission in the set of symbols, based at least in part on the at least one of the SSB communication or the PDCCH communication associated with the CSS being associated with a serving cell.

In a tenth aspect, alone or in combination with one or more of the first through ninth aspects, process 1000 includes transmitting the uplink transmission in the set of symbols, and refraining from receiving the at least one of the SSB communication or the PDCCH communication associated with the CSS in the set of symbols, based at least in part on the at least one of the SSB communication or the PDCCH communication associated with the CSS being transmitted outside an SSB measurement timing configuration window associated with a serving cell.

In an eleventh aspect, alone or in combination with one or more of the first through tenth aspects, process 1000 includes receiving configuration information indicating that the set of symbols is associated with an uplink slot, transmitting the uplink transmission in the set of symbols, and refraining from receiving the at least one of the SSB communication or the PDCCH communication associated with the CSS in the set of symbols, based at least in part on the configuration information indicating that the set of symbols is associated with the uplink slot.

Although FIG. 10 shows example blocks of process 1000, in some aspects, process 1000 may include additional blocks, fewer blocks, different blocks, or differently arranged blocks than those depicted in FIG. 10. Additionally, or alternatively, two or more of the blocks of process 1000 may be performed in parallel.

Figure 11:
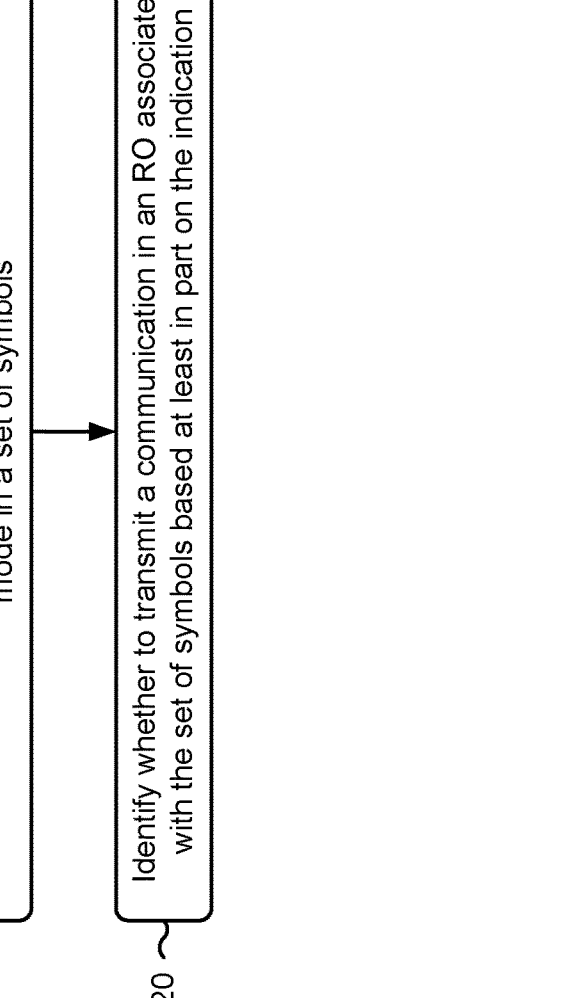
FIG. 11 is a diagram illustrating an example process performed, for example, by a UE, in accordance with the present disclosure.

FIG. 11 is a diagram illustrating an example process 1100 performed, for example, by a UE, in accordance with the present disclosure. Example process 1100 is an example where the UE (e.g., UE 120) performs operations associated with collision handling for SBFD-aware UEs.

As shown in FIG. 11, in some aspects, process 1100 may include receiving an indication that a network node is operating in an SBFD mode in a set of symbols (block 1110). For example, the UE (e.g., using communication manager 140 and/or reception component 1202, depicted in FIG. 12) may receive an indication that a network node is operating in an SBFD mode in a set of symbols, as described above.

As further shown in FIG. 11, in some aspects, process 1100 may include identifying whether to transmit a communication in an RO associated with the set of symbols based at least in part on the indication (block 1120). For example, the UE (e.g., using communication manager 140, identification component 1208, and/or SBFD component 1210, depicted in FIG. 12) may identify whether to transmit a communication in an RO associated with the set of symbols based at least in part on the indication, as described above.

Process 1100 may include additional aspects, such as any single aspect or any combination of aspects described below and/or in connection with one or more other processes described elsewhere herein.

In a first aspect, the indication is received via at least one of a broadcast message or a radio resource control message.

In a second aspect, alone or in combination with the first aspect, process 1100 includes receiving configuration information indicating that the set of symbols is associated with a downlink slot.

In a third aspect, alone or in combination with one or more of the first and second aspects, process 1100 includes transmitting the communication in the RO based at least in part on the configuration information indicating that the set of symbols is associated with the downlink slot.

In a fourth aspect, alone or in combination with one or more of the first through third aspects, process 1100 includes transmitting the communication in the RO based at least in part on the communication being associated with a contention based random access procedure.

In a fifth aspect, alone or in combination with one or more of the first through fourth aspects, process 1100 includes transmitting the communication in the RO based at least in part on the communication being associated with a contention free random access procedure.

In a sixth aspect, alone or in combination with one or more of the first through fifth aspects, process 1100 includes treating the set of symbols as flexible symbols, and transmitting the communication in the RO.

In a seventh aspect, alone or in combination with one or more of the first through sixth aspects, process 1100 includes identifying that an error case has occurred based at least in part on the indication that the network node is operating in the SBFD mode associated with the set of symbols and the configuration information indicating that the set of symbols is associated with the downlink slot.

In an eighth aspect, alone or in combination with one or more of the first through seventh aspects, process 1100 includes receiving at least one of configuration information or DCI scheduling a downlink transmission in the set of symbols.

In a ninth aspect, alone or in combination with one or more of the first through eighth aspects, process 1100 includes transmitting the communication in the RO associated with the set of symbols, and refraining from receiving the downlink transmission in the set of symbols, based at least in part on the at least one of configuration information or the DCI scheduling the downlink transmission in the set of symbols.

In a tenth aspect, alone or in combination with one or more of the first through ninth aspects, process 1100 includes receiving the downlink transmission in the set of symbols, and refraining from transmitting the communication in the RO associated with the set of symbols, based at least in part on the UE not having a random access communication to transmit in the set of symbols.

In an eleventh aspect, alone or in combination with one or more of the first through tenth aspects, process 1100 includes transmitting the communication in the RO associated with the set of symbols, and refraining from receiving the downlink transmission in the set of symbols, based at least in part on the UE having a random access communication to transmit in the set of symbols.

In a twelfth aspect, alone or in combination with one or more of the first through eleventh aspects, process 1100 includes receiving the downlink transmission in the set of symbols, and refraining from transmitting the communication in the RO associated with the set of symbols, based at least in part on the set of symbols being associated with a monitoring occasion associated with a physical downlink control channel communication.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
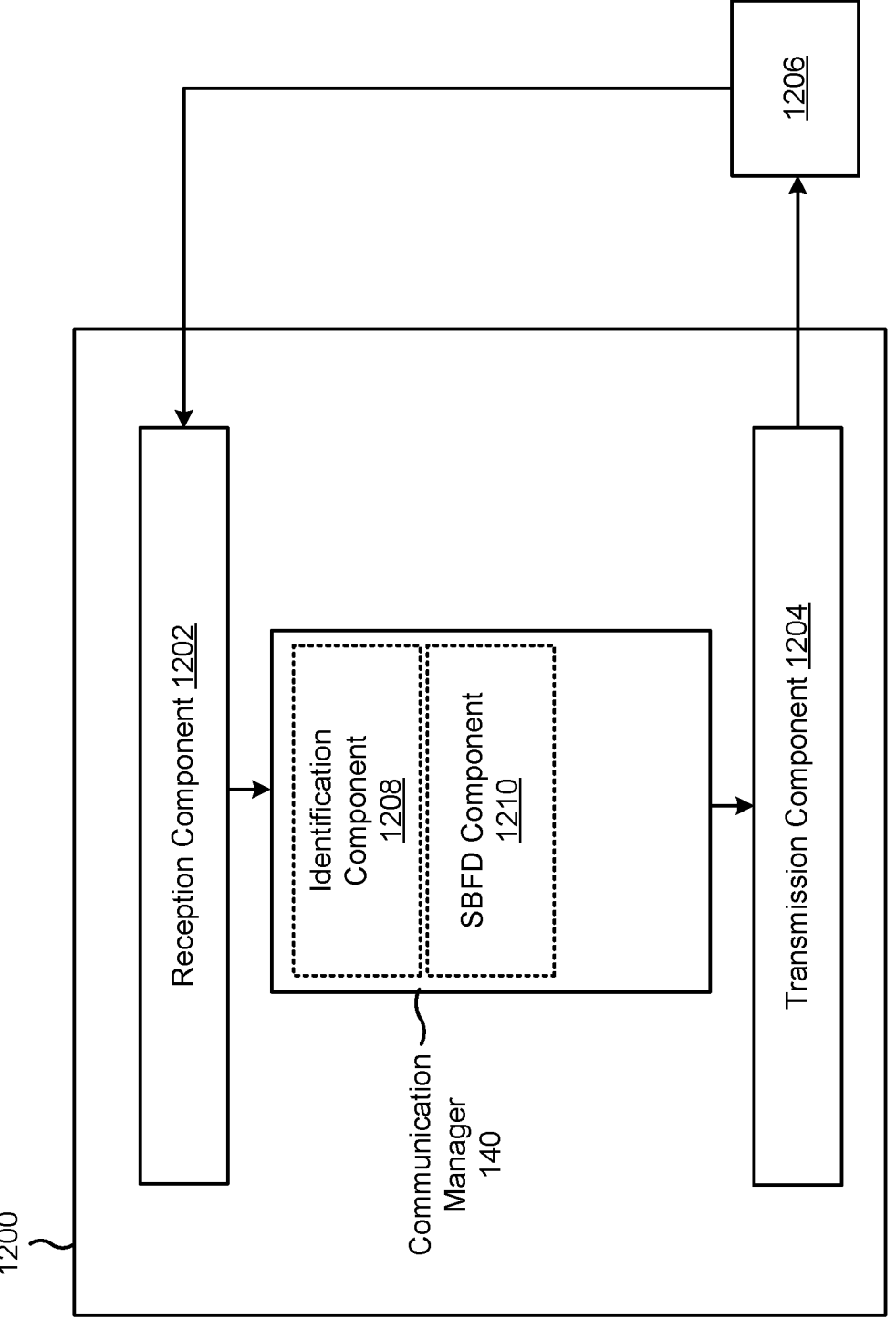
FIG. 12 is a diagram of an example apparatus for wireless communication, in accordance with the present disclosure.

FIG. 12 is a diagram of an example apparatus 1200 for wireless communication, in accordance with the present disclosure. The apparatus 1200 may be a UE 120, or a UE may include the apparatus 1200. In some aspects, the apparatus 1200 includes a reception component 1202 and a transmission component 1204, which may be in communication with one another (for example, via one or more buses and/or one or more other components). As shown, the apparatus 1200 may communicate with another apparatus 1206 (such as a UE, a network node, or another wireless communication device) using the reception component 1202 and the transmission component 1204. As further shown, the apparatus 1200 may include the communication manager 140. The communication manager 140 may include one or more of an identification component 1208 or an SBFD component 1210, among other examples.

In some aspects, the apparatus 1200 may be configured to perform one or more operations described herein in connection with FIGS. 8-9. Additionally, or alternatively, the apparatus 1200 may be configured to perform one or more processes described herein, such as process 1000 of FIG. 10, process 1100 of FIG. 11, or a combination thereof. In some aspects, the apparatus 1200 and/or one or more components shown in FIG. 12 may include one or more components of the UE 120 described in connection with FIG. 2. Additionally, or alternatively, one or more components shown in FIG. 12 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1202 may receive communications, such as reference signals, control information, data communications, or a combination thereof, from the apparatus 1206. The reception component 1202 may provide received communications to one or more other components of the apparatus 1200. In some aspects, the reception component 1202 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1200. In some aspects, the reception component 1202 may include one or more antennas, a modem, a demodulator, a MIMO detector, a receive processor, a controller/processor, a memory, or a combination thereof, of the UE 120 described in connection with FIG. 2.

The transmission component 1204 may transmit communications, such as reference signals, control information, data communications, or a combination thereof, to the apparatus 1206. In some aspects, one or more other components of the apparatus 1200 may generate communications and may provide the generated communications to the transmission component 1204 for transmission to the apparatus 1206. In some aspects, the transmission component 1204 may perform signal processing on the generated communications (such as filtering, amplification, modulation, digital-to-analog conversion, multiplexing, interleaving, mapping, or encoding, among other examples), and may transmit the processed signals to the apparatus 1206. In some aspects, the transmission component 1204 may include one or more antennas, a modem, a modulator, a transmit MIMO processor, a transmit processor, a controller/processor, a memory, or a combination thereof, of the UE 120 described in connection with FIG. 2. In some aspects, the transmission component 1204 may be co-located with the reception component 1202 in a transceiver.

The reception component 1202 may receive an indication that a network node is operating in an SBFD mode in a set of symbols. The identification component 1208 and/or the SBFD component 1210 may identify whether to receive at least one of an SSB communication or a PDCCH communication associated with a CSS in the set of symbols based at least in part on the indication.

The reception component 1202 may receive configuration information indicating that the set of symbols is associated with an uplink slot.

The reception component 1202 and/or the SBFD component 1210 may receive the at least one of the SSB communication or the PDCCH communication associated with the CSS based at least in part on the configuration information indicating that the set of symbols is associated with the uplink slot.

The reception component 1202 and/or the SBFD component 1210 may receive the at least one of the SSB communication or the PDCCH communication associated with the CSS based at least in part on the at least one of the SSB communication or the PDCCH communication associated with the CSS being associated with a serving cell.

The SBFD component 1210 may refrain from receiving the SSB communication or the PDCCH communication associated with the CSS based at least in part on the at least one of the SSB communication or the PDCCH communication associated with the CSS being transmitted outside an SSB measurement timing configuration window associated with a serving cell.

The SBFD component 1210 may refrain from receiving the at least one of the SSB communication or the PDCCH communication associated with the CSS based at least in part on the configuration information indicating that the set of symbols is associated with the uplink slot.

The reception component 1202 may receive at least one of configuration information or DCI scheduling an uplink transmission in the set of symbols.

The reception component 1202 and/or the SBFD component 1210 may receive the at least one of the SSB communication or the PDCCH communication associated with the CSS in the set of symbols, and refrain from transmitting the uplink transmission in the set of symbols, based at least in part on the at least one of the configuration information or the DCI scheduling the uplink transmission in the set of symbols.

The reception component 1202 and/or the SBFD component 1210 may receive the at least one of the SSB communication or the PDCCH communication associated with the CSS in the set of symbols, and refrain from transmitting the uplink transmission in the set of symbols, based at least in part on the at least one of the SSB communication or the PDCCH communication associated with the CSS being associated with a serving cell.

The transmission component 1204 and/or the SBFD component 1210 may transmit the uplink transmission in the set of symbols, and refrain from receiving the at least one of the SSB communication or the PDCCH communication associated with the CSS in the set of symbols, based at least in part on the at least one of the SSB communication or the PDCCH communication associated with the CSS being transmitted outside an SSB measurement timing configuration window associated with a serving cell.

The reception component 1202 may receive configuration information indicating that the set of symbols is associated with an uplink slot.

The transmission component 1204 and/or the SBFD component 1210 may transmit the uplink transmission in the set of symbols, and refrain from receiving the at least one of the SSB communication or the PDCCH communication associated with the CSS in the set of symbols, based at least in part on the configuration information indicating that the set of symbols is associated with the uplink slot.

The identification component 1208 and/or the SBFD component 1210 may identify whether to transmit a communication in an RO associated with the set of symbols based at least in part on the indication.

The reception component 1202 may receive configuration information indicating that the set of symbols is associated with a downlink slot.

The transmission component 1204 and/or the SBFD component 1210 may transmit the communication in the RO based at least in part on the configuration information indicating that the set of symbols is associated with the downlink slot.

The transmission component 1204 and/or the SBFD component 1210 may transmit the communication in the RO based at least in part on the communication being associated with a contention based random access procedure.

The transmission component 1204 and/or the SBFD component 1210 may transmit the communication in the RO based at least in part on the communication being associated with a contention free random access procedure.

The SBFD component 1210 may treat the set of symbols as flexible symbols.

The transmission component 1204 and/or the SBFD component 1210 may transmit the communication in the RO.

The identification component 1208 and/or the SBFD component 1210 may identify that an error case has occurred based at least in part on the indication that the network node is operating in the SBFD mode associated with the set of symbols and the configuration information indicating that the set of symbols is associated with the downlink slot.

The reception component 1202 may receive at least one of configuration information or DCI scheduling a downlink transmission in the set of symbols.

The transmission component 1204 and/or the SBFD component 1210 may transmit the communication in the RO associated with the set of symbols, and refrain from receiving the downlink transmission in the set of symbols, based at least in part on the at least one of configuration information or the DCI scheduling the downlink transmission in the set of symbols.

The reception component 1202 and/or the SBFD component 1210 may receive the downlink transmission in the set of symbols, and refrain from transmitting the communication in the RO associated with the set of symbols, based at least in part on the UE not having a random access communication to transmit in the set of symbols.

The transmission component 1204 and/or the SBFD component 1210 may transmit the communication in the RO associated with the set of symbols, and refrain from receiving the downlink transmission in the set of symbols, based at least in part on the UE having a random access communication to transmit in the set of symbols.

The reception component 1202 and/or the SBFD component 1210 may receive the downlink transmission in the set of symbols, and refrain from transmitting the communication in the RO associated with the set of symbols, based at least in part on the set of symbols being associated with a monitoring occasion associated with a physical downlink control channel communication.

The number and arrangement of components shown in FIG. 12 are provided as an example. In practice, there may be additional components, fewer components, different components, or differently arranged components than those shown in FIG. 12. Furthermore, two or more components shown in FIG. 12 may be implemented within a single component, or a single component shown in FIG. 12 may be implemented as multiple, distributed components. Additionally, or alternatively, a set of (one or more) components shown in FIG. 12 may perform one or more functions described as being performed by another set of components shown in FIG. 12.

The following provides an overview of some Aspects of the present disclosure:

Aspect 1: A method of wireless communication performed by a UE, comprising: receiving an indication that a network node is operating in an SBFD mode in a set of symbols; and identifying whether to receive at least one of an SSB communication or a PDCCH communication associated with a CSS in the set of symbols based at least in part on the indication.

Aspect 2: The method of Aspect 1, wherein the indication is received via at least one of a broadcast message or a radio resource control message.

Aspect 3: The method of any of Aspects 1-2, further comprising receiving configuration information indicating that the set of symbols is associated with an uplink slot.

Aspect 4: The method of Aspect 3, further comprising receiving the at least one of the SSB communication or the PDCCH communication associated with the CSS based at least in part on the configuration information indicating that the set of symbols is associated with the uplink slot.

Aspect 5: The method of any of Aspects 3-4, further comprising receiving the at least one of the SSB communication or the PDCCH communication associated with the CSS based at least in part on the at least one of the SSB communication or the PDCCH communication associated with the CSS being associated with a serving cell.

Aspect 6: The method of Aspect 3, further comprising refraining from receiving the SSB communication or the PDCCH communication associated with the CSS based at least in part on the at least one of the SSB communication or the PDCCH communication associated with the CSS being transmitted outside an SSB measurement timing configuration window associated with a serving cell.

Aspect 7: The method of Aspect 3, further comprising refraining from receiving the at least one of the SSB communication or the PDCCH communication associated with the CSS based at least in part on the configuration information indicating that the set of symbols is associated with the uplink slot.

Aspect 8: The method of any of Aspects 1-3, further comprising receiving at least one of configuration information or DCI scheduling an uplink transmission in the set of symbols.

Aspect 9: The method of Aspect 8, further comprising receiving the at least one of the SSB communication or the PDCCH communication associated with the CSS in the set of symbols, and refraining from transmitting the uplink transmission in the set of symbols, based at least in part on the at least one of the configuration information or the DCI scheduling the uplink transmission in the set of symbols.

Aspect 10: The method of any of Aspects 8-9, further comprising receiving the at least one of the SSB communication or the PDCCH communication associated with the CSS in the set of symbols, and refraining from transmitting the uplink transmission in the set of symbols, based at least in part on the at least one of the SSB communication or the PDCCH communication associated with the CSS being associated with a serving cell.

Aspect 11: The method of Aspect 8, further comprising transmitting the uplink transmission in the set of symbols, and refraining from receiving the at least one of the SSB communication or the PDCCH communication associated with the CSS in the set of symbols, based at least in part on the at least one of the SSB communication or the PDCCH communication associated with the CSS being transmitted outside an SSB measurement timing configuration window associated with a serving cell.

Aspect 12: The method of Aspect 8, further comprising: receiving configuration information indicating that the set of symbols is associated with an uplink slot; and transmitting the uplink transmission in the set of symbols, and refraining from receiving the at least one of the SSB communication or the PDCCH communication associated with the CSS in the set of symbols, based at least in part on the configuration information indicating that the set of symbols is associated with the uplink slot.

Aspect 13: A method of wireless communication performed by a UE, comprising: receiving an indication that a network node is operating in an SBFD mode in a set of symbols; and identifying whether to transmit a communication in an RO associated with the set of symbols based at least in part on the indication.

Aspect 14: The method of Aspect 13, wherein the indication is received via at least one of a broadcast message or a radio resource control message.

Aspect 15: The method of any of Aspects 13-14, further comprising receiving configuration information indicating that the set of symbols is associated with a downlink slot.

Aspect 16: The method of Aspect 15, further comprising transmitting the communication in the RO based at least in part on the configuration information indicating that the set of symbols is associated with the downlink slot.

Aspect 17: The method of any of Aspects 15-16, further comprising transmitting the communication in the RO based at least in part on the communication being associated with a contention based random access procedure.

Aspect 18: The method of any of Aspects 15-16, further comprising transmitting the communication in the RO based at least in part on the communication being associated with a contention free random access procedure.

Aspect 19: The method of any of Aspects 15-18, further comprising: treating the set of symbols as flexible symbols; and transmitting the communication in the RO.

Aspect 20: The method of Aspect 15, further comprising identifying that an error case has occurred based at least in part on the indication that the network node is operating in the SBFD mode associated with the set of symbols and the configuration information indicating that the set of symbols is associated with the downlink slot.

Aspect 21: The method of any of Aspects 13-15, further comprising receiving at least one of configuration information or DCI scheduling a downlink transmission in the set of symbols.

Aspect 22: The method of Aspect 21, further comprising transmitting the communication in the RO associated with the set of symbols, and refraining from receiving the downlink transmission in the set of symbols, based at least in part on the at least one of configuration information or the DCI scheduling the downlink transmission in the set of symbols.

Aspect 23: The method of Aspect 21, further comprising receiving the downlink transmission in the set of symbols, and refraining from transmitting the communication in the RO associated with the set of symbols, based at least in part on the UE not having a random access communication to transmit in the set of symbols.

Aspect 24: The method of Aspect 21, further comprising transmitting the communication in the RO associated with the set of symbols, and refraining from receiving the downlink transmission in the set of symbols, based at least in part on the UE having a random access communication to transmit in the set of symbols.

Aspect 25: The method of Aspect 21, further comprising receiving the downlink transmission in the set of symbols, and refraining from transmitting the communication in the RO associated with the set of symbols, based at least in part on the set of symbols being associated with a monitoring occasion associated with a physical downlink control channel communication.

Aspect 26: An apparatus for wireless communication at a device, comprising a processor; memory coupled with the processor; and instructions stored in the memory and executable by the processor to cause the apparatus to perform the method of one or more of Aspects 1-12.

Aspect 27: A device for wireless communication, comprising a memory and one or more processors coupled to the memory, the one or more processors configured to perform the method of one or more of Aspects 1-12.

Aspect 28: An apparatus for wireless communication, comprising at least one means for performing the method of one or more of Aspects 1-12.

Aspect 29: A non-transitory computer-readable medium storing code for wireless communication, the code comprising instructions executable by a processor to perform the method of one or more of Aspects 1-12.

Aspect 30: A non-transitory computer-readable medium storing a set of instructions for wireless communication, the set of instructions comprising one or more instructions that, when executed by one or more processors of a device, cause the device to perform the method of one or more of Aspects 1-12.

Aspect 31: An apparatus for wireless communication at a device, comprising a processor; memory coupled with the processor; and instructions stored in the memory and executable by the processor to cause the apparatus to perform the method of one or more of Aspects 13-25.

Aspect 32: A device for wireless communication, comprising a memory and one or more processors coupled to the memory, the one or more processors configured to perform the method of one or more of Aspects 13-25.

Aspect 33: An apparatus for wireless communication, comprising at least one means for performing the method of one or more of Aspects 13-25.

Aspect 34: A non-transitory computer-readable medium storing code for wireless communication, the code comprising instructions executable by a processor to perform the method of one or more of Aspects 13-25.

Aspect 35: A non-transitory computer-readable medium storing a set of instructions for wireless communication, the set of instructions comprising one or more instructions that, when executed by one or more processors of a device, cause the device to perform the method of one or more of Aspects 13-25.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
one or more memories; and
one or more processors, coupled to the one or more memories, configured to:
receive an indication that a network node is operating in a sub-band full duplex (SBFD) mode in a set of symbols; and
identify whether to receive at least one of a synchronization signal block (SSB) communication or a physical downlink control channel (PDCCH) communication associated with a common search space (CSS) in the set of symbols based at least in part on the indication.

2. The UE of claim 1, wherein the one or more processors are further configured to receive the indication via at least one of a broadcast message or a radio resource control message.

3. The UE of claim 1, wherein the one or more processors are further configured to receive configuration information indicating that the set of symbols is associated with an uplink slot.

4. The UE of claim 3, wherein the one or more processors are further configured to receive the at least one of the SSB communication or the PDCCH communication associated with the CSS based at least in part on the configuration information indicating that the set of symbols is associated with the uplink slot.

5. The UE of claim 3, wherein the one or more processors are further configured to refrain from receiving the at least one of the SSB communication or the PDCCH communication associated with the CSS based at least in part on the configuration information indicating that the set of symbols is associated with the uplink slot.

6. The UE of claim 1, wherein the one or more processors are further configured to receive the at least one of the SSB communication or the PDCCH communication associated with the CSS based at least in part on the at least one of the SSB communication or the PDCCH communication associated with the CSS being associated with a serving cell.

7. The UE of claim 1, wherein the one or more processors are further configured to refrain from receiving the SSB communication or the PDCCH communication associated with the CSS based at least in part on the at least one of the SSB communication or the PDCCH communication associated with the CSS being transmitted outside an SSB measurement timing configuration window associated with a serving cell.

8. The UE of claim 1, wherein the one or more processors are further configured to receive at least one of configuration information or downlink control information (DCI) scheduling an uplink transmission in the set of symbols.

9. The UE of claim 8, wherein the one or more processors are further configured to receive the at least one of the SSB communication or the PDCCH communication associated with the CSS in the set of symbols, and refrain from transmitting the uplink transmission in the set of symbols, based at least in part on the at least one of the configuration information or the DCI scheduling the uplink transmission in the set of symbols.

10. The UE of claim 8, wherein the one or more processors are further configured to receive the at least one of the SSB communication or the PDCCH communication associated with the CSS in the set of symbols, and refrain from transmitting the uplink transmission in the set of symbols, based at least in part on the at least one of the SSB communication or the PDCCH communication associated with the CSS being associated with a serving cell.

11. The UE of claim 8, wherein the one or more processors are further configured to transmit the uplink transmission in the set of symbols, and refrain from receiving the at least one of the SSB communication or the PDCCH communication associated with the CSS in the set of symbols, based at least in part on the at least one of the SSB communication or the PDCCH communication associated with the CSS being transmitted outside an SSB measurement timing configuration window associated with a serving cell.

12. The UE of claim 8, wherein the one or more processors are further configured to:
  receive configuration information indicating that the set of symbols is associated with an uplink slot; and
  transmit the uplink transmission in the set of symbols, and refrain from receiving the at least one of the SSB communication or the PDCCH communication associated with the CSS in the set of symbols, based at least in part on the configuration information indicating that the set of symbols is associated with the uplink slot.

13. A user equipment (UE) for wireless communication, comprising:
  one or more memories; and one or more processors, coupled to the one or more memories, configured to:
    receive an indication that a network node is operating in a sub-band full duplex (SBFD) mode in a set of symbols;
    receive configuration information indicating that the set of symbols is associated with a downlink slot; and
    identify, based at least in part on the indication and the configuration information, that an error case has occurred or that a communication is to be transmitted in a random access channel (RACH) occasion (RO) associated with the set of symbols.

14. The UE of claim 13, wherein the one or more processors are further configured to receive the indication via at least one of a broadcast message or a radio resource control message.

15. The UE of claim 13, wherein the one or more processors are further configured to transmit the communication in the RO based at least in part on the configuration information indicating that the set of symbols is associated with the downlink slot.

16. The UE of claim 13, wherein the one or more processors are further configured to transmit the communication in the RO based at least in part on the communication being associated with a contention based random access procedure.

17. The UE of claim 13, wherein the one or more processors are further configured to transmit the communication in the RO based at least in part on the communication being associated with a contention free random access procedure.

18. The UE of claim 13, wherein the one or more processors are further configured to:
  treat the set of symbols as flexible symbols; and
  transmit the communication in the RO.

19. The UE of claim 13, wherein the one or more processors are further configured to receive at least one of configuration information or downlink control information (DCI) scheduling a downlink transmission in the set of symbols.

20. The UE of claim 19, wherein the one or more processors are further configured to transmit the communication in the RO associated with the set of symbols, and refrain from receiving the downlink transmission in the set of symbols, based at least in part on the at least one of configuration information or the DCI scheduling the downlink transmission in the set of symbols.

21. The UE of claim 19, wherein the one or more processors are further configured to receive the downlink transmission in the set of symbols, and refrain from transmitting the communication in the RO associated with the set of symbols, based at least in part on the UE not having a random access communication to transmit in the set of symbols.

22. The UE of claim 19, wherein the one or more processors are further configured to transmit the communication in the RO associated with the set of symbols, and refrain from receiving the downlink transmission in the set of symbols, based at least in part on the UE having a random access communication to transmit in the set of symbols.

23. The UE of claim 19, wherein the one or more processors are further configured to receive the downlink transmission in the set of symbols, and refrain from transmitting the communication in the RO associated with the set of symbols, based at least in part on the set of symbols being associated with a monitoring occasion associated with a physical downlink control channel communication.

24. A method of wireless communication performed by a user equipment (UE), comprising:

receiving an indication that a network node is operating in a sub-band full duplex (SBFD) mode in a set of symbols; and identifying whether to receive at least one of a synchronization signal block (SSB) communication or a physical downlink control channel (PDCCH) communication associated with a common search space (CSS) in the set of symbols based at least in part on the indication.

25. The method of claim 24, further comprising:

receiving configuration information indicating that the set of symbols is associated with an uplink slot; and receiving the at least one of the SSB communication or the PDCCH communication associated with the CSS based at least in part on the configuration information indicating that the set of symbols is associated with the uplink slot.

26. The method of claim 24, further comprising:

receiving configuration information indicating that the set of symbols is associated with an uplink slot; and receiving the at least one of the SSB communication or the PDCCH communication associated with the CSS based at least in part on the at least one of the SSB communication or the PDCCH communication associated with the CSS being associated with a serving cell.

27. The method of claim 24, further comprising:

receiving configuration information indicating that the set of symbols is associated with an uplink slot; and refraining from receiving the SSB communication or the PDCCH communication associated with the CSS based at least in part on the at least one of the SSB communication or the PDCCH communication associated with the CSS being transmitted outside an SSB measurement timing configuration window associated with a serving cell.

28. The method of claim 24, further comprising:

receiving configuration information indicating that the set of symbols is associated with an uplink slot; and refraining from receiving the at least one of the SSB communication or the PDCCH communication associated with the CSS based at least in part on the configuration information indicating that the set of symbols is associated with the uplink slot.

29. A method of wireless communication performed by a user equipment (UE), comprising:

receiving an indication that a network node is operating in a sub-band full duplex (SBFD) mode in a set of symbols;

receiving configuration information indicating that the set of symbols is associated with a downlink slot; and identifying, based at least in part on the indication and the configuration information, that an error case has occurred or that a communication is to be transmitted in a random access channel (RACH) occasion (RO) associated with the set of symbols.

30. The method of claim 29, further comprising:

transmitting the communication in the RO based at least in part on the configuration information indicating that the set of symbols is associated with the downlink slot.

* * * * *